US011710286B2

(12) United States Patent
Greasley

(10) Patent No.: US 11,710,286 B2
(45) Date of Patent: *Jul. 25, 2023

(54) VIRTUAL OBJECT KIT

(71) Applicant: Apple Inc., Cupertino, CA (US)

(72) Inventor: Jack R. Greasley, Mill Valley, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/230,330

(22) Filed: Apr. 14, 2021

(65) Prior Publication Data

US 2021/0233329 A1 Jul. 29, 2021

Related U.S. Application Data

(63) Continuation of application No. 16/552,160, filed on Aug. 27, 2019, now Pat. No. 11,010,986.

(60) Provisional application No. 62/725,079, filed on Aug. 30, 2018.

(51) Int. Cl.
*G06T 19/00* (2011.01)
*G06T 19/20* (2011.01)

(52) U.S. Cl.
CPC .......... *G06T 19/20* (2013.01); *G06T 2200/24* (2013.01); *G06T 2219/2008* (2013.01); *G06T 2219/2021* (2013.01)

(58) Field of Classification Search
None
See application file for complete search history.

(56) References Cited

U.S. PATENT DOCUMENTS

| 5,894,310 | A | * | 4/1999 | Arsenault | G06T 19/00 |
| | | | | | 345/679 |
| 6,552,722 | B1 | * | 4/2003 | Shih | G06F 3/03545 |
| | | | | | 345/419 |
| 7,990,375 | B2 | * | 8/2011 | Kohli | G06F 30/30 |
| | | | | | 345/619 |
| 8,578,352 | B1 | | 11/2013 | Mitrovic et al. | |
| 10,228,836 | B2 | * | 3/2019 | Palmaro | G06F 3/011 |
| 2002/0095423 | A1 | | 7/2002 | Dessloch et al. | |
| 2003/0137509 | A1 | * | 7/2003 | Bauer | G06F 16/904 |
| | | | | | 345/419 |
| 2007/0078636 | A1 | * | 4/2007 | Elsberg | G06F 30/13 |
| | | | | | 703/2 |

(Continued)

OTHER PUBLICATIONS

Chinese First Office Action dated Aug. 26, 2021, CN Application No. 201910815537.6, pp. 1-13 (Includes English Translation of Patent Search Report).

*Primary Examiner* — Martin Mushambo
(74) *Attorney, Agent, or Firm* — Fernando & Partners, LLP

(57) ABSTRACT

In some implementations, a method includes obtaining a virtual object kit that includes a set of virtual object templates of a particular virtual object type. In some implementations, the virtual object kit includes a plurality of groups of components. In some implementations, each of the plurality of groups of components is associated with a particular portion of a virtual object. In some implementations, the method includes receiving a request to assemble a virtual object. In some implementations, the request includes a selection of components from at least some of the plurality of groups of components. In some implementations, the method includes synthesizing the virtual object in accordance with the request.

24 Claims, 42 Drawing Sheets

(56) References Cited

U.S. PATENT DOCUMENTS

| | | | |
|---|---|---|---|
| 2007/0146390 A1* | 6/2007 | Noro | G06F 3/014 345/633 |
| 2007/0200846 A1 | 8/2007 | Nakamura | |
| 2008/0004119 A1* | 1/2008 | Van Luchene | A63F 13/63 463/42 |
| 2010/0164953 A1* | 7/2010 | Wouhaybi | A63F 13/20 715/852 |
| 2011/0090219 A1* | 4/2011 | Kruglick | G06Q 30/02 345/420 |
| 2012/0306853 A1* | 12/2012 | Wright | G06T 19/20 345/589 |
| 2013/0335405 A1* | 12/2013 | Scavezze | A63F 13/61 345/419 |
| 2014/0035908 A1* | 2/2014 | Powell | G06T 13/40 345/419 |
| 2014/0267239 A1* | 9/2014 | Wilson | G06T 17/005 345/419 |
| 2014/0327690 A1* | 11/2014 | McGuire | G06T 15/005 345/589 |
| 2016/0196692 A1* | 7/2016 | Kjallstrom | G06F 3/0346 345/633 |
| 2016/0253842 A1* | 9/2016 | Shapira | G06T 19/006 345/633 |
| 2017/0052676 A1* | 2/2017 | Pulier | G06F 3/017 |
| 2017/0065879 A1* | 3/2017 | Barney | A63F 13/73 |
| 2017/0235377 A1 | 8/2017 | Marcolina et al. | |
| 2017/0244811 A1* | 8/2017 | Mckenzie | H04W 76/14 |
| 2017/0330385 A1* | 11/2017 | Kinstner | G06T 19/006 |
| 2017/0336941 A1* | 11/2017 | Gribetz | G06T 19/20 |
| 2017/0336951 A1* | 11/2017 | Palmaro | G06T 19/20 |
| 2018/0096506 A1 | 4/2018 | Valdivia et al. | |
| 2018/0197343 A1 | 7/2018 | Hare et al. | |
| 2018/0330096 A1* | 11/2018 | Breindel | A63F 13/358 |
| 2018/0330627 A1* | 11/2018 | Hwang | G09B 19/00 |
| 2019/0034076 A1* | 1/2019 | Vinayak | G06F 3/0346 |
| 2019/0108578 A1* | 4/2019 | Spivack | G09B 5/065 |
| 2019/0132375 A1* | 5/2019 | Gebbie | H04L 65/762 |
| 2019/0240580 A1* | 8/2019 | Walker | A63F 13/65 |
| 2019/0251747 A1* | 8/2019 | Yin | G06F 30/00 |
| 2019/0294721 A1* | 9/2019 | Keifer | G06F 16/282 |
| 2019/0340830 A1* | 11/2019 | Srinivasan | G06T 15/005 |

* cited by examiner

VIRTUAL OBJECT KIT

CROSS REFERENCE TO RELATED APPLICATIONS

This application is a continuation application of and claims priority to U.S. patent application Ser. No. 16/552,160, filed on Aug. 27, 2019, which claims priority to U.S. patent application No. 62/725,079, filed on Aug. 30, 2018, which are hereby incorporated by reference in their entirety.

TECHNICAL FIELD

The present disclosure generally relates to virtual object kits.

BACKGROUND

Some devices are capable of generating and presenting computer-generated reality (CGR) environments. Some CGR environments include virtual environments that are simulated replacements of physical environments. Some CGR environments include augmented environments that are modified versions of physical environments. Some devices that present CGR environments include mobile communication devices such as smartphones, head-mountable displays (HMDs), eyeglasses, heads-up displays (HUDs), and optical projection systems. Most previously available devices that present CGR environments are ineffective at presenting representations of certain objects. For example, some previously available devices that present CGR environments are unsuitable for presenting representations of objects that are associated with an action.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 1M-1O are diagrams of the example virtual object kit in accordance with some implementations.

FIGS. 1Y-1AG are diagrams of the example virtual object kit in accordance with some implementations.

FIGS. 1AH-1K are diagrams of the example virtual object container in accordance with some implementations.

FIG. 1AL is a diagram of an example virtual object supplemental kit in accordance with some implementations.

Figure 1A:
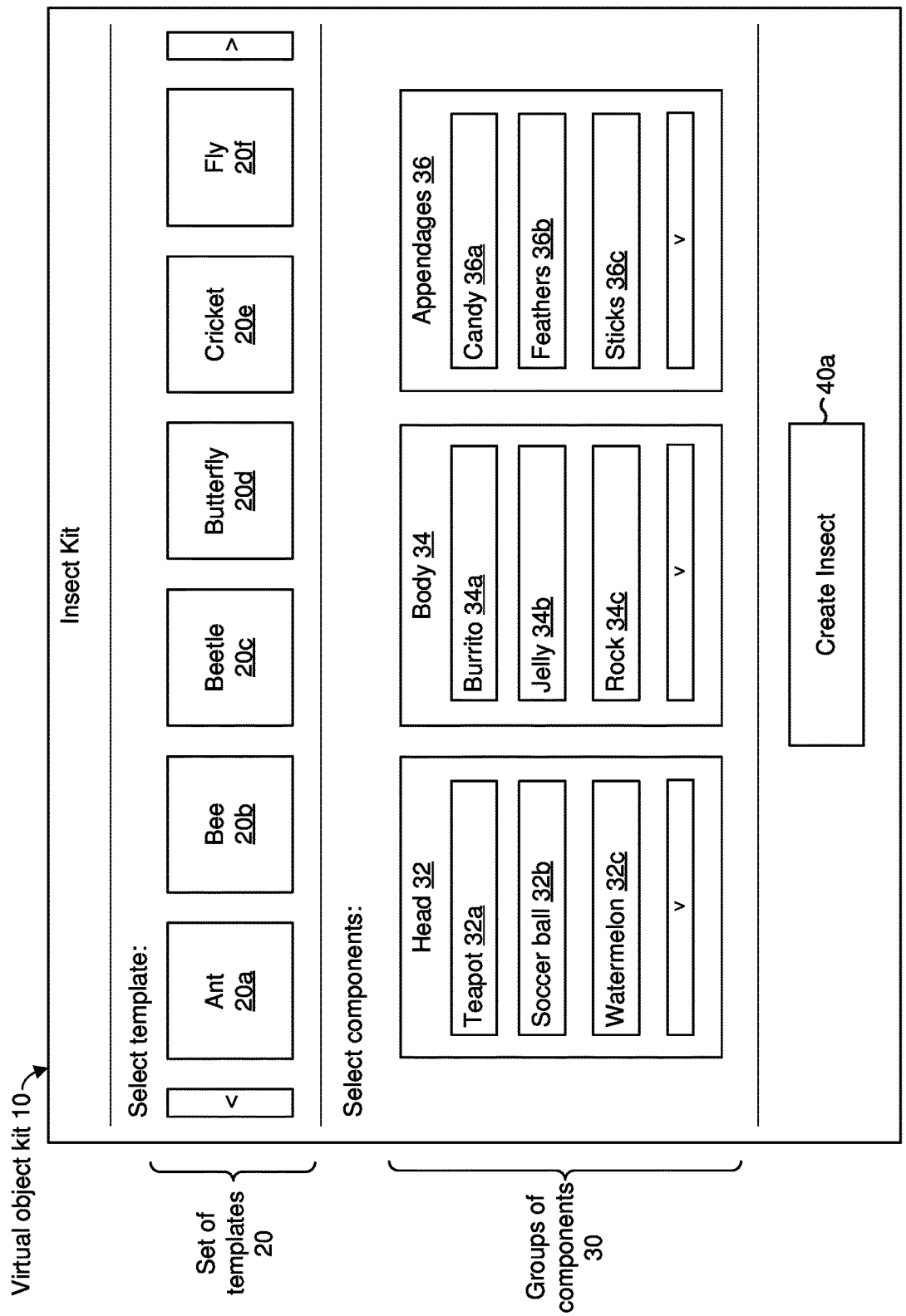
FIGS. 1A-1J are diagrams of an example virtual object kit in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for synthesizing a virtual object from a virtual object kit. In various implementations, a device includes a display, a non-transitory memory and one or more processors coupled with the display and the non-transitory memory. In some implementations, a method includes obtaining a virtual object kit that includes a set of virtual object templates of a particular virtual object type. In some implementations, the virtual object kit includes a plurality of groups of components. In some implementations, each of the plurality of groups of components is associated with a particular portion of a virtual object. In some implementations, the method includes receiving a request to assemble a virtual object. In some implementations, the request includes a selection of one of the virtual object templates from the set of virtual object templates. In some implementations, the request includes a selection of components from at least some of the plurality of groups of components. In some implementations, the method includes synthesizing the virtual object in accordance with the request. In some implementations, a set of actions that the virtual object performs in a computer-generated reality (CGR) environment is a function of the components that the virtual object includes.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

The present disclosure provides methods, systems, and/or devices for synthesizing a virtual object from a virtual object kit. In various implementations, a virtual object performs actions that satisfy an objective. The virtual object kit enables a user of a device to create a customized virtual object. For example, the virtual object kit allows the user to synthesize a virtual object by selecting different components from the virtual object kit. In some implementations, the virtual object kit enhances the user experience of a device by allowing a user of the device to create customized virtual objects. In some implementations, the virtual object kit improves the functionality of the device by enabling the device to synthesize and display customized virtual objects.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIGS. 1A-1J are diagrams of an example virtual object kit 10 for synthesizing an insect virtual object. As such, in some implementations, the virtual object kit 10 is referred to as an insect virtual object kit. Referring to FIG. 1A, the virtual object kit 10 includes a set of virtual object templates 20 ("templates 20", hereinafter for the sake of brevity) of a particular virtual object type. In some implementations, a virtual object kit includes templates of species of a particular type. In the example of FIG. 1A, the templates 20 correspond to various insects. As illustrated in FIG. 1A, the templates 20 include an ant template 20a for synthesizing an ant virtual object, a bee template 20b for synthesizing a bee virtual object, a beetle template 20c for synthesizing a beetle virtual object, a butterfly template 20d for synthesizing a butterfly virtual object, a cricket template 20e for synthesizing a cricket virtual object, and a fly template 20f for synthesizing a fly virtual object. In some implementations, a user scrolls through the templates 20 to identify a desired template.

As illustrated in FIG. 1A, the virtual object kit 10 includes groups of components 30. In some implementations, each group of components 30 is associated with a particular portion of a virtual object. In the example of FIG. 1A, the groups of components 30 include a head component group 32, a body component group 34 and an appendages component group 36. The head component group 32 includes components that can be selected as a head of the insect virtual object. In the example of FIG. 1A, the head component group 32 includes a teapot affordance 32a for selecting a teapot as the head, a soccer ball affordance 32b for selecting a soccer ball as the head, and a watermelon affordance 32c for selecting a watermelon as the head. The body component group 34 includes components that can be selected as a body (e.g., a torso) of the insect virtual object. In the example of FIG. 1A, the body component group 34 includes a burrito affordance 34a for selecting a burrito as the body, a jelly affordance 34b for selecting a jelly as the body, and a rock affordance 34c for selecting a rock as the body. The appendages component group 36 includes a candy affordance 36a for selecting candy as the appendages, a feathers affordance 36b for selecting feathers as the appendages, and a sticks affordance 36c for selecting sticks as the appendages.

In the example of FIG. 1A, the virtual object kit 10 includes a create affordance 40a (e.g., a create insect virtual object affordance). In response to receiving a selection of the create affordance 40a, the virtual object kit 10 creates an insect virtual object with the selected components. In some implementations, a selection of the create affordance 40a represents a request to create an insect virtual object with the selected components.

Figure 1B:
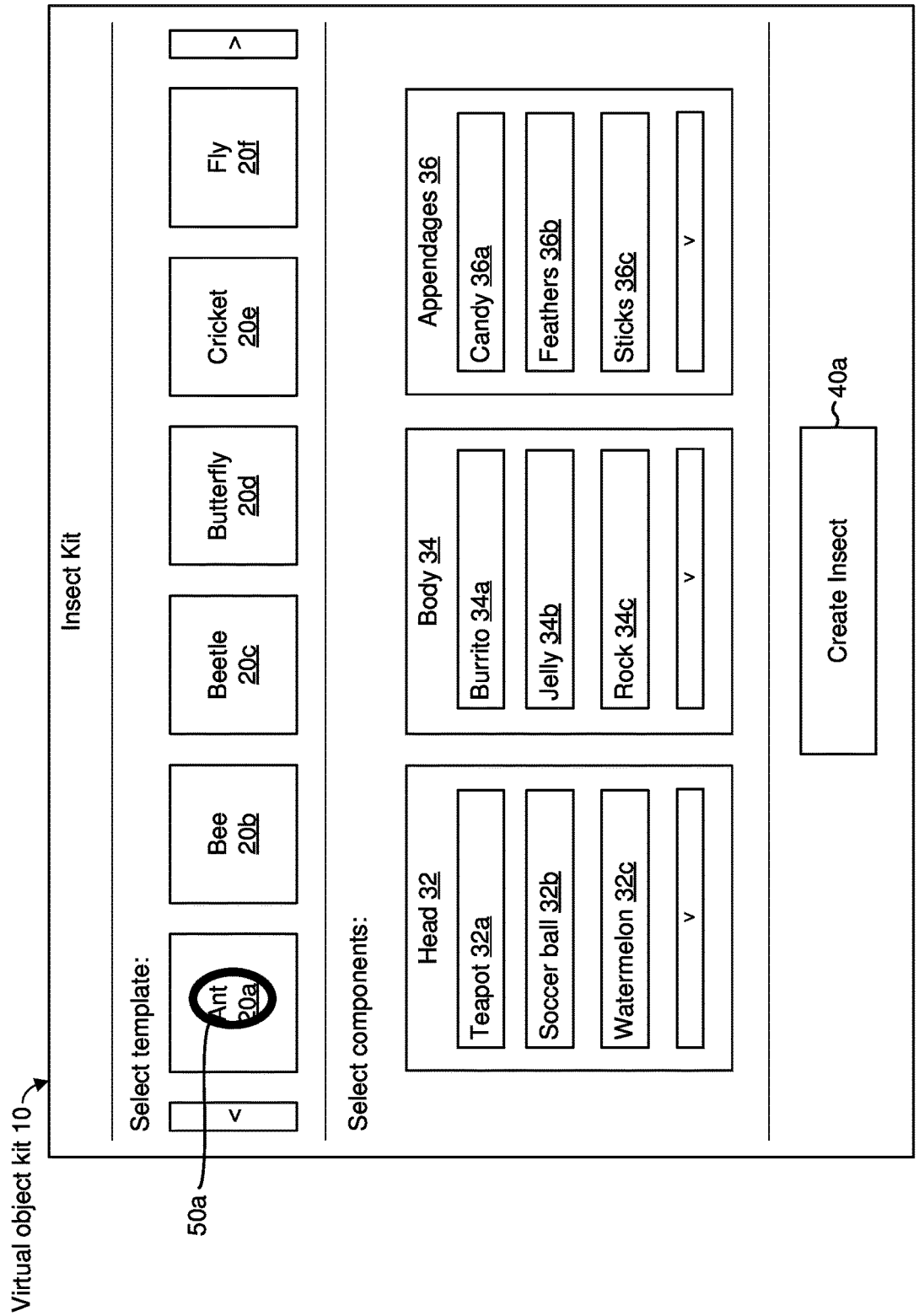

FIG. 1B illustrates a user input 50a selecting the ant template 20a. The user input 50a corresponds to a request to synthesize an ant virtual object.

Figure 1C:
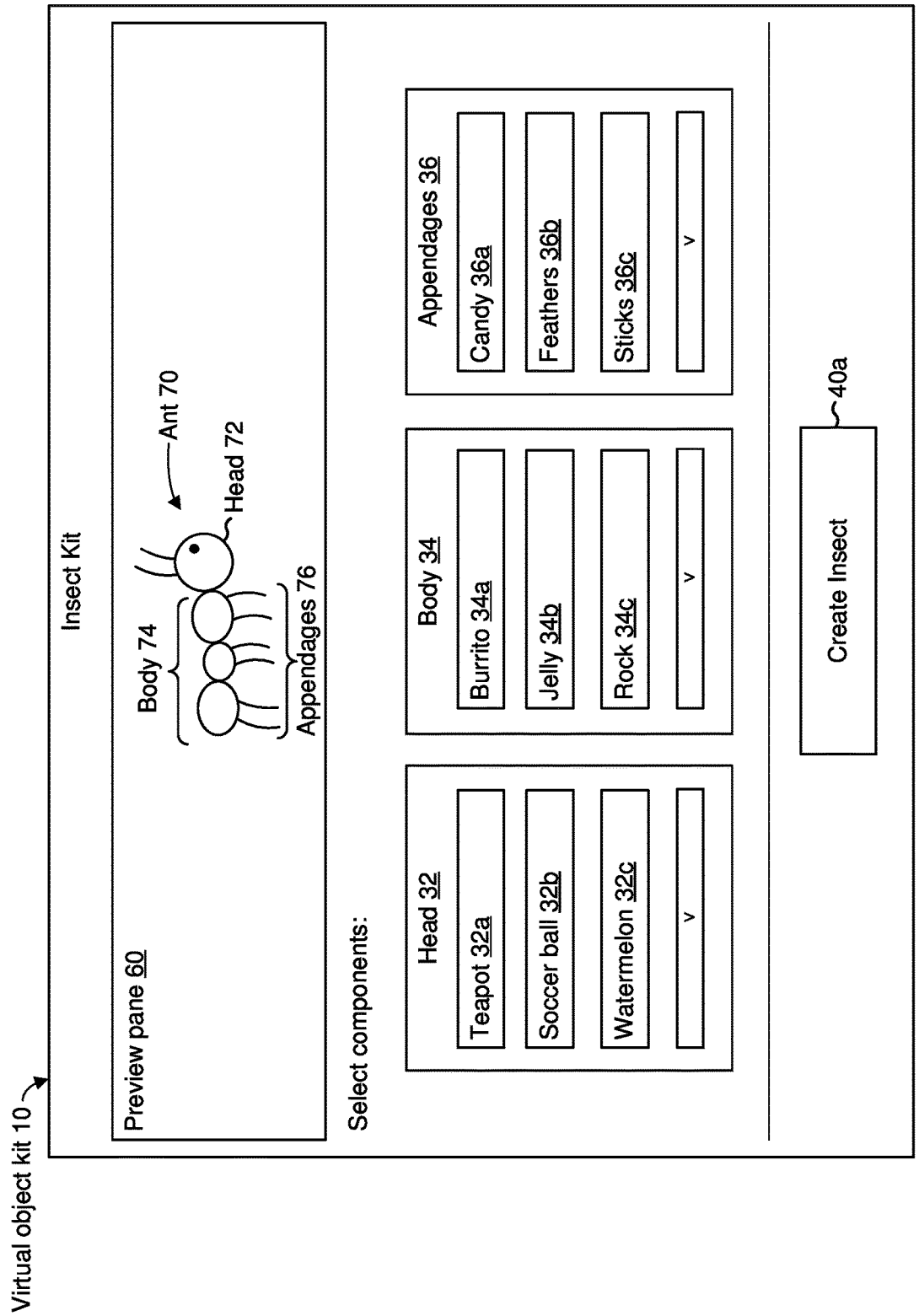

Referring to FIG. 1C, in response to a selection of the ant template 20a in FIG. 1B, the virtual object kit 10 displays a preview pane 60. The preview pane 60 illustrates an ant virtual object 70 with a head 72 (e.g., a default head component), a body 74 (e.g., a default body component) and appendages 76 (e.g., default appendages). The head 72, the body 74 and the appendages 76 illustrated in FIG. 1C are default components of the ant virtual object 70. The default components of the ant virtual object 70 can be replaced with components from the head component group 32, the body component group 34 and the appendages component group 36.

Figure 1D:
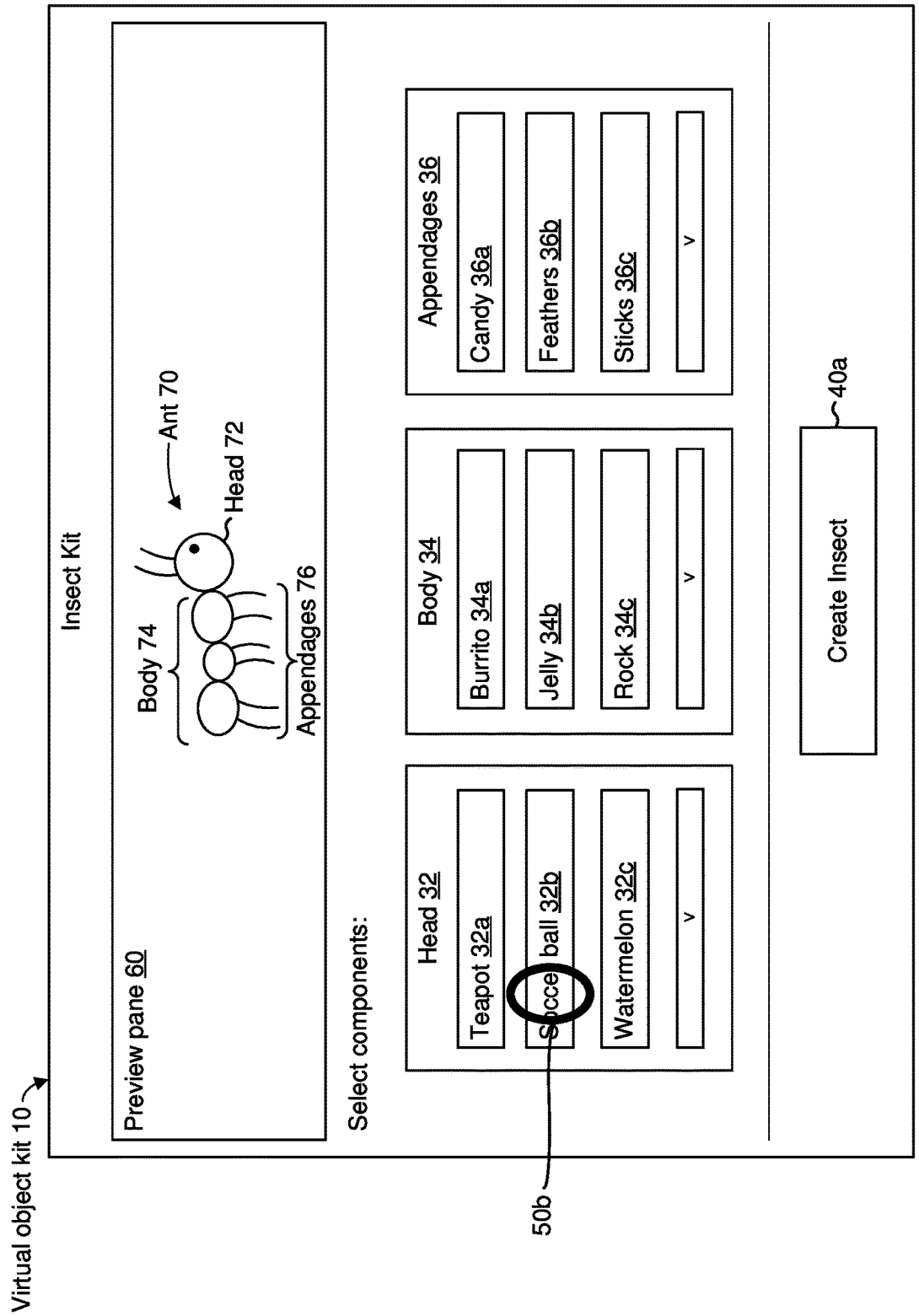

FIG. 1D illustrates a user input 50b selecting the soccer ball affordance 32b. The user input 50b corresponds to a request to utilize a soccer ball as the head 72 of the ant virtual object 70. In some implementations, the user input 50b corresponds to a request to replace a default head component of the ant virtual object 70 with a soccer ball.

Figure 1E:
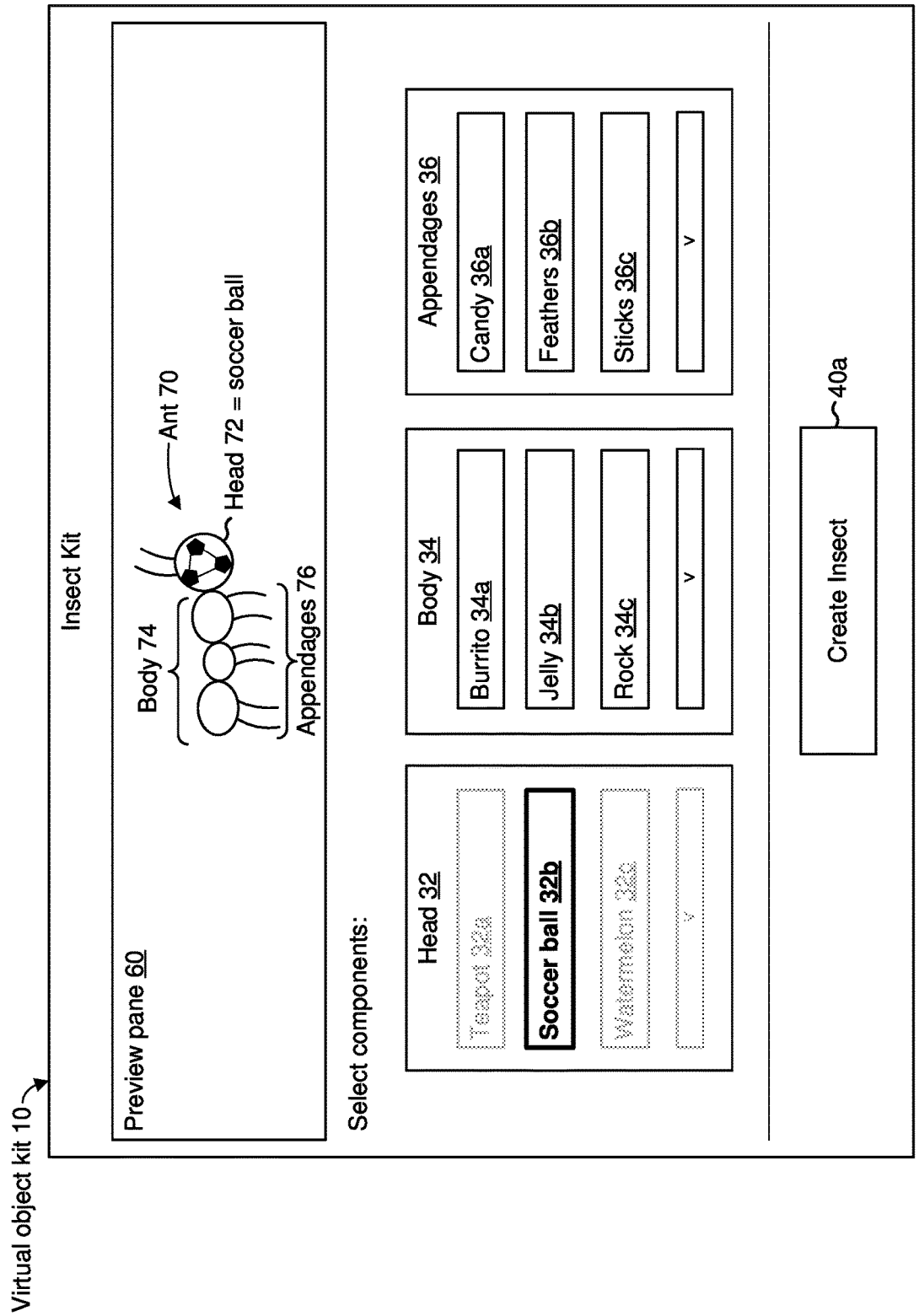

As illustrated in FIG. 1E, in response to a selection of the soccer ball affordance 32b in FIG. 1D, a soccer ball is utilized as the head 72 of the ant virtual object 70. In some implementations, an appearance of the soccer ball affordance 32b is changed (e.g., bolded) to indicate that a soccer ball is being utilized as the head 72 of the ant virtual object 70. In some implementations, an appearance of the teapot affordance 32a and the watermelon affordance 32c is changed (e.g., grayed-out) to indicate that additional head components cannot be selected.

Figure 1F:
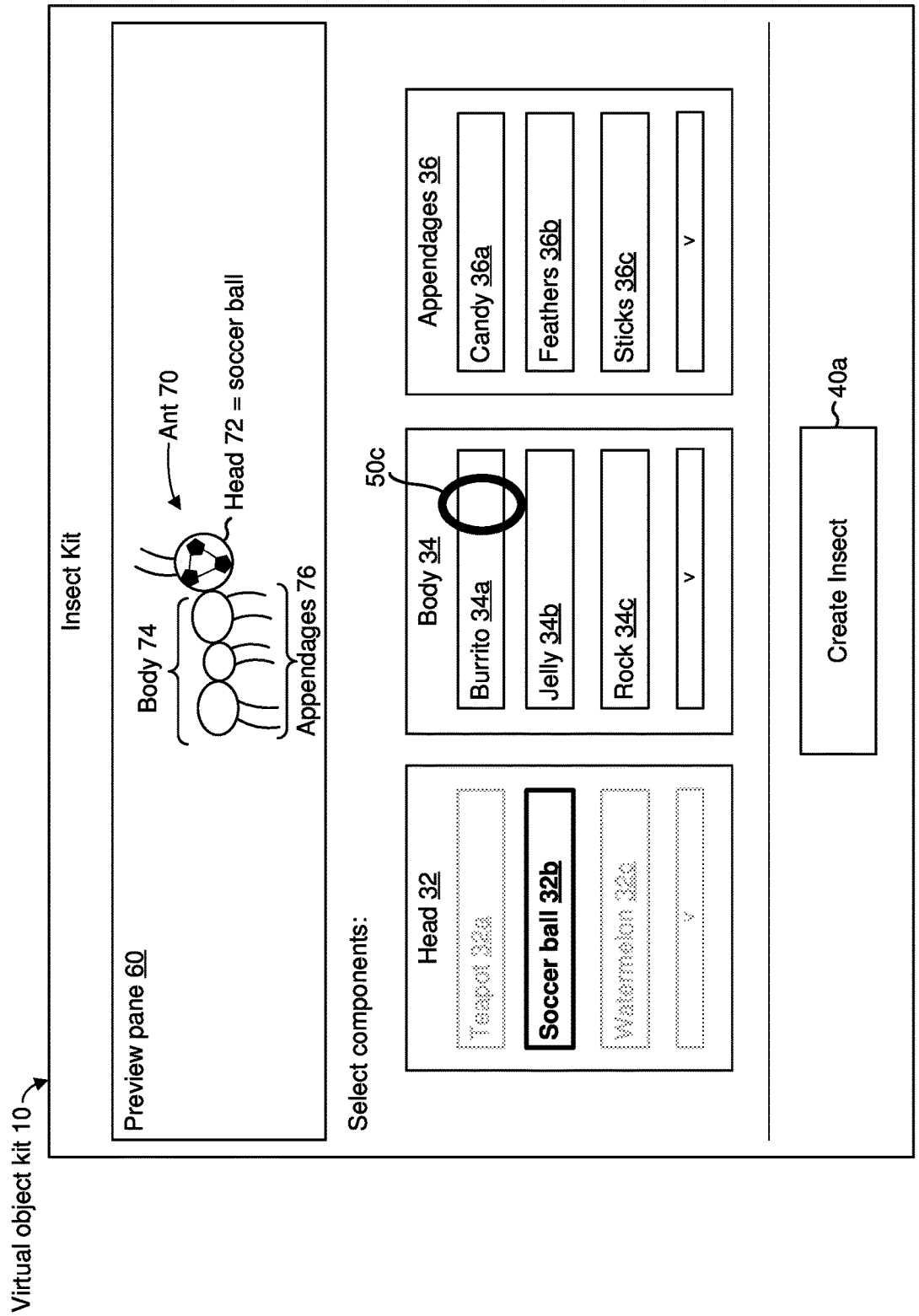

FIG. 1F illustrates a user input 50c selecting the burrito affordance 34a. The user input 50c corresponds to a request to utilize a burrito as the body 74 of the ant virtual object 70. In some implementations, the user input 50c corresponds to a request to replace a default body component of the ant virtual object 70 with a burrito.

Figure 1G:
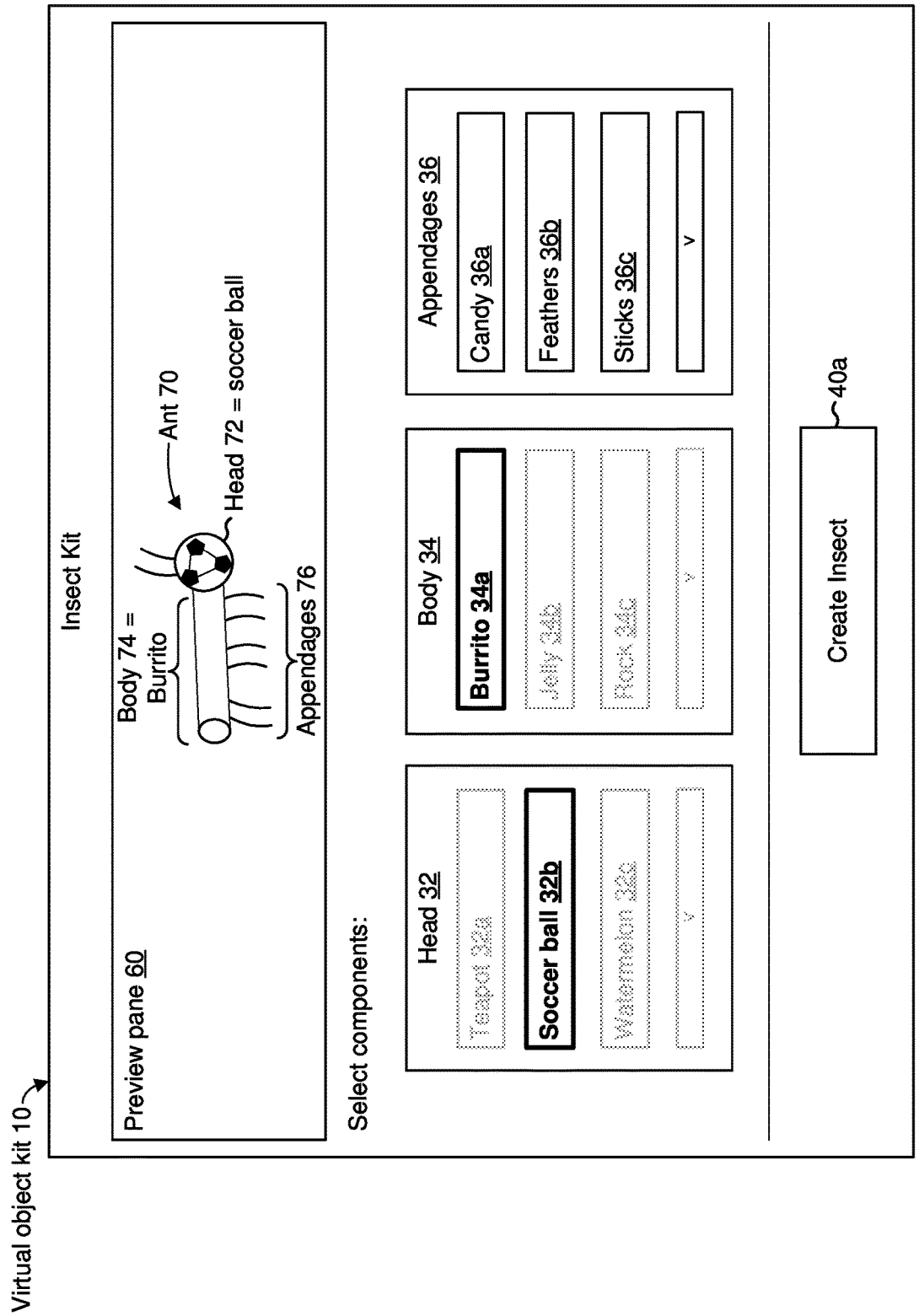

As illustrated in FIG. 1G, in response to a selection of the burrito affordance 34a in FIG. 1F, a burrito is utilized as the body 74 of the ant virtual object 70. In some implementations, an appearance of the burrito affordance 34a is changed (e.g., bolded) to indicate that a burrito is being utilized as the body 74 of the ant virtual object 70. In some implementations, an appearance of the jelly affordance 34*b* and the rock affordance 34*c* is changed (e.g., grayed-out) to indicate that additional body components cannot be selected.

Figure 1H:
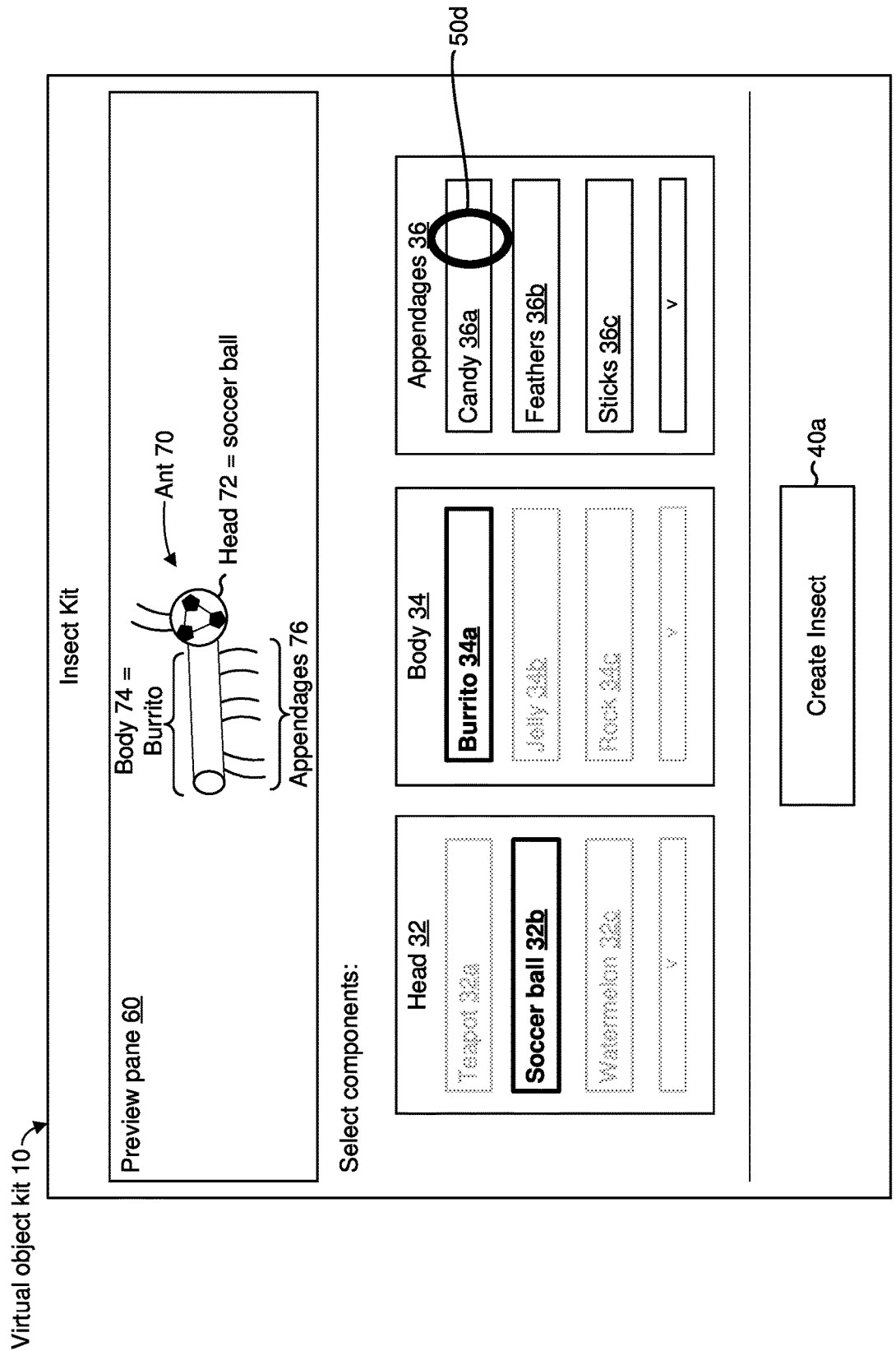

FIG. 1H illustrates a user input 50*d* selecting the candy affordance 36*a*. The user input 50*d* corresponds to a request to utilize candy (e.g., candy canes, candy bars, etc.) as the appendages 76 of the ant virtual object 70. In some implementations, the user input 50*d* corresponds to a request to replace default appendages of the ant virtual object 70 with candy.

Figure 1I:
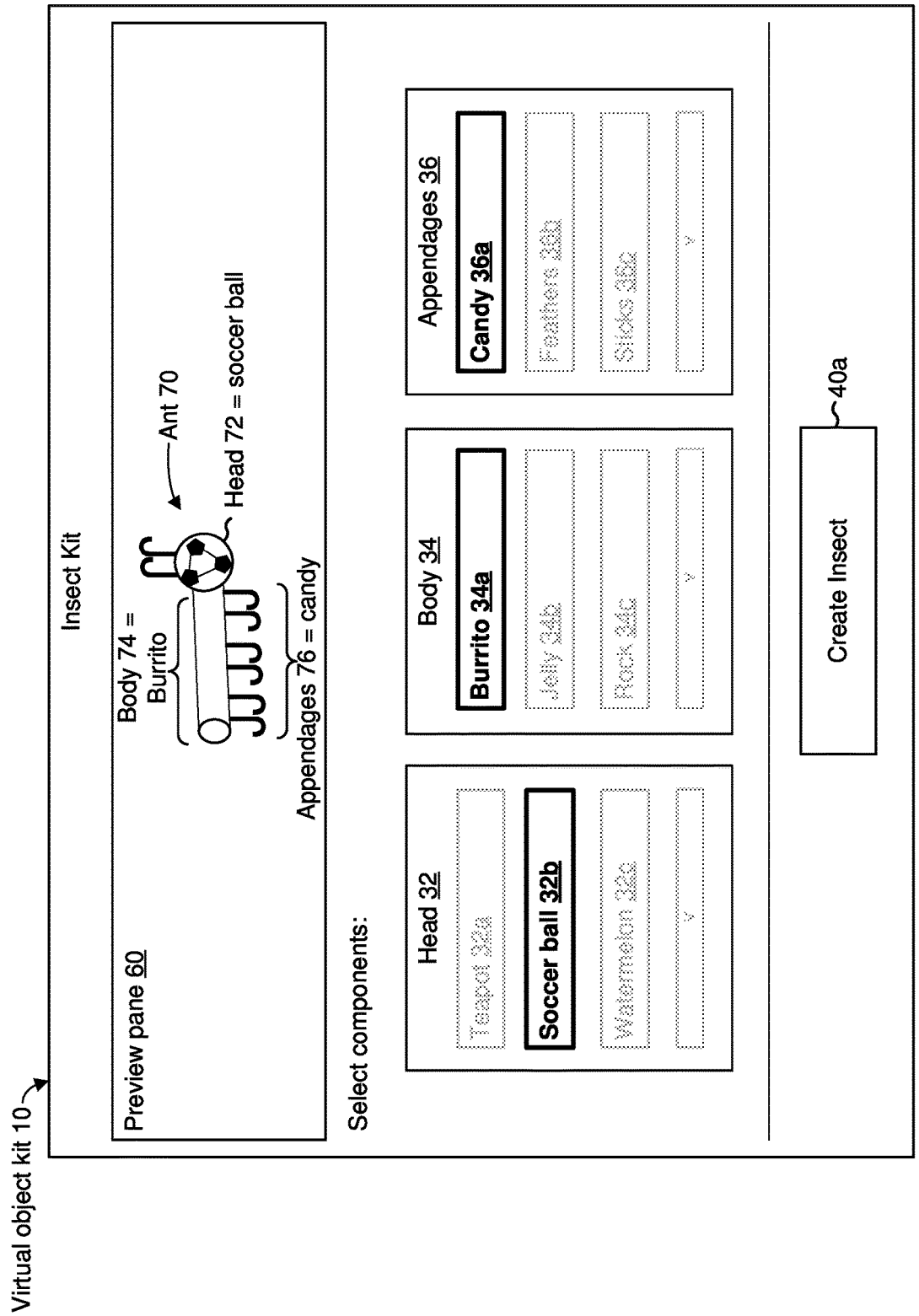

As illustrated in FIG. 1I, in response to a selection of the candy affordance 36*a* in FIG. 1H, candy is utilized as the appendages 76 of the ant virtual object 70. In some implementations, an appearance of the candy affordance 36*a* is changed (e.g., bolded) to indicate that candy is being utilized as the appendages 76 of the ant virtual object 70. In some implementations, an appearance of the feathers affordance 36*b* and the sticks affordance 36*c* is changed (e.g., grayed-out) to indicate that additional appendage components cannot be selected.

Figure 1J:
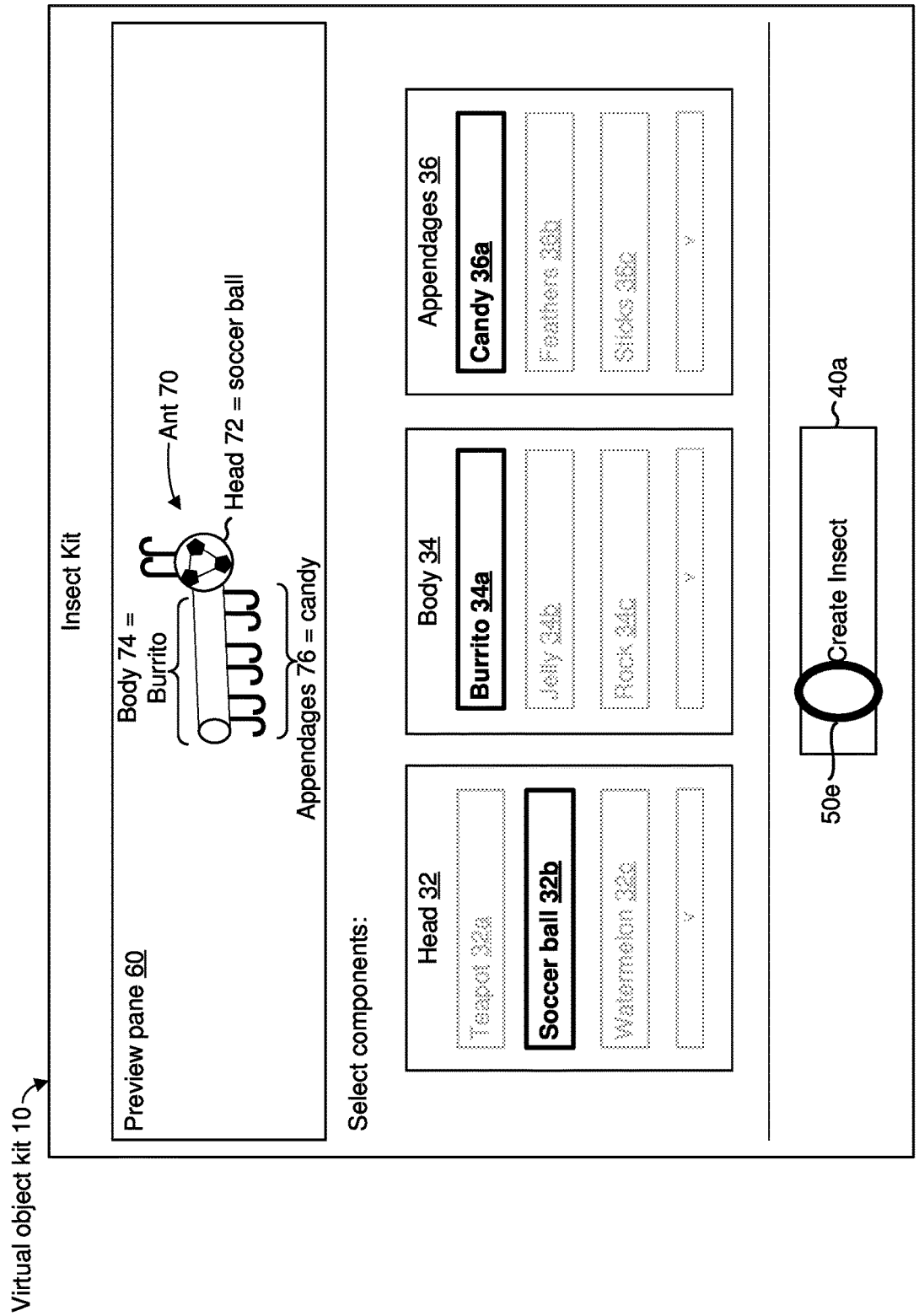

FIG. 1J illustrates a user input 50*e* selecting the create affordance 40*a*. The user input 50*e* corresponds to a request to synthesize the ant virtual object 70 shown in the preview pane 60 of FIG. 1J. In the example of FIG. 1J, the user input 50*e* corresponds to a request to synthesize the ant virtual object 70 with a soccer ball as the head 72, a burrito as the body 74 and candy as the appendages 76.

Figure 1K:
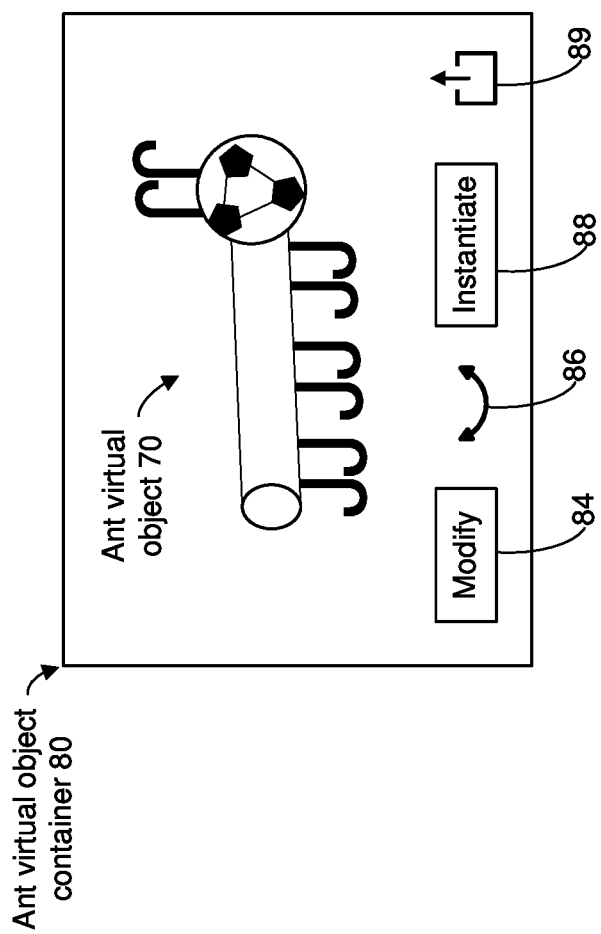
FIGS. 1K-1L are diagrams of an example virtual object container in accordance with some implementations.

FIG. 1K illustrates an ant virtual object container 80 that includes the ant virtual object 70. In the example of FIG. 1K, the ant virtual object container 80 includes a modify affordance 84, a rotate affordance 86, an instantiate affordance 88, and a share affordance. The modify affordance 84 provides an option to modify the ant virtual object 70. The rotate affordance 86 provides an option to rotate the ant virtual object 70 within the ant virtual object container 80. The instantiate affordance 88 provides an option to instantiate the ant virtual object 70 in a CGR environment where the ant virtual object 70 performs actions which satisfy an objective of the ant virtual object 70. The share affordance 89 provides options to share the ant virtual object 70.

Figure 1L:
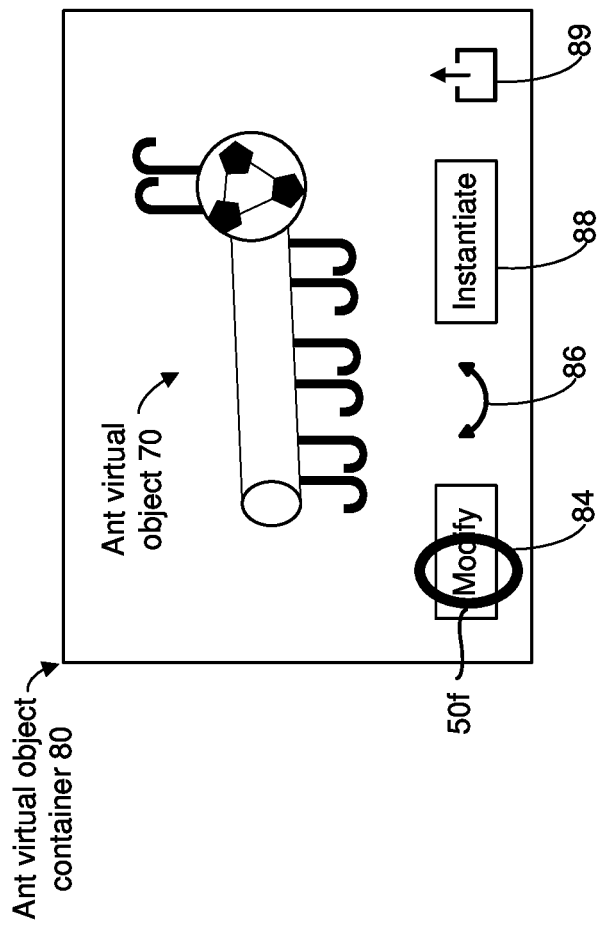

FIG. 1L illustrates a user input 50*f* selecting the modify affordance 84. The user input 50*f* corresponds to a request to modify the ant virtual object 70.

Figure 1M:
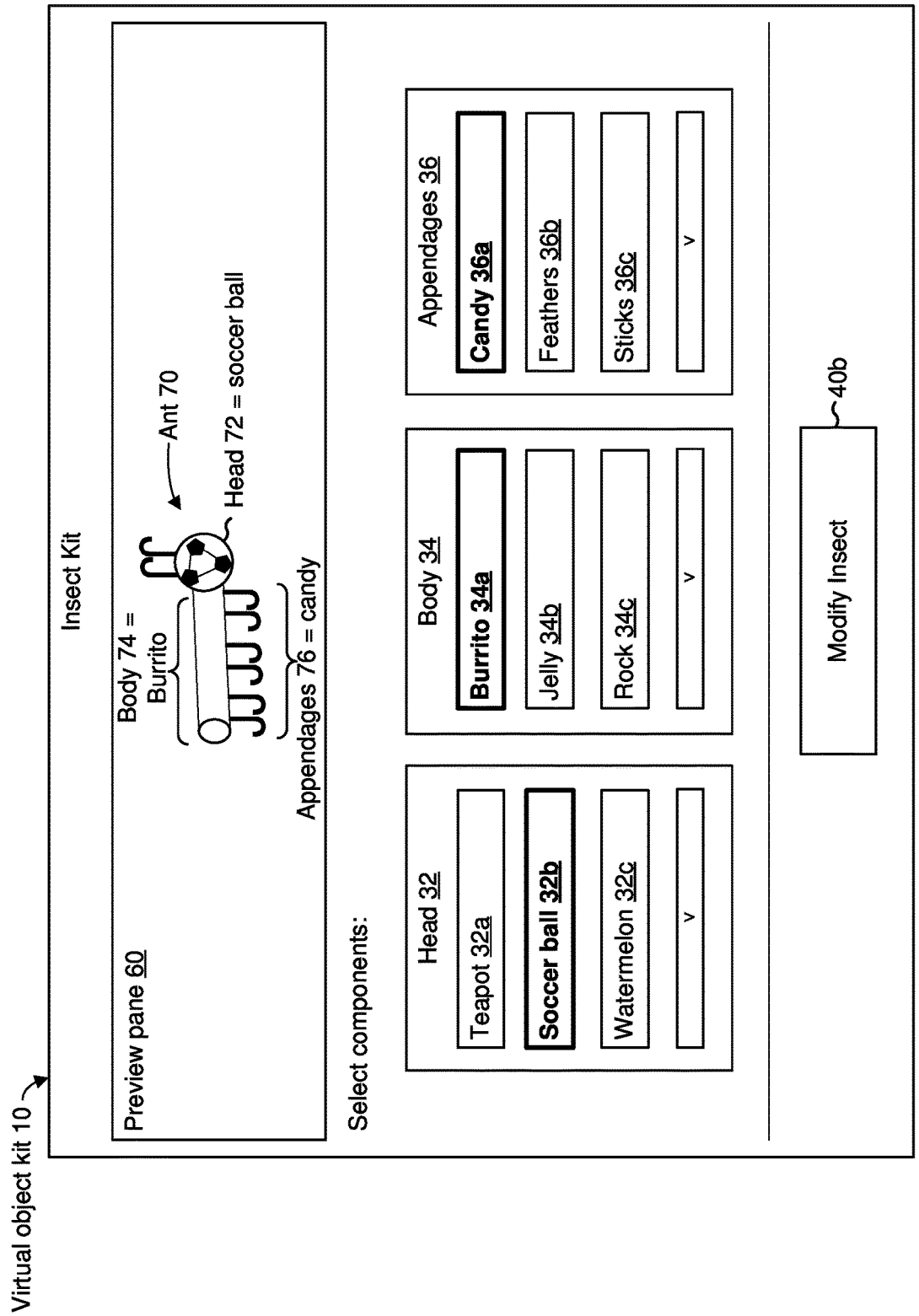

FIG. 1M illustrates the virtual object kit 10 with an option to modify the ant virtual object 70. As illustrated in FIG. 1M, the virtual object kit 10 includes a modify affordance 40*b*. In the example of FIG. 1M, affordances corresponding to current selections of components have a different appearance from affordances corresponding to other available components. For example, the soccer ball affordance 32*b* is shown in bold, whereas the teapot affordance 32*a* and the watermelon affordance 32*c* are not bold.

Figure 1N:
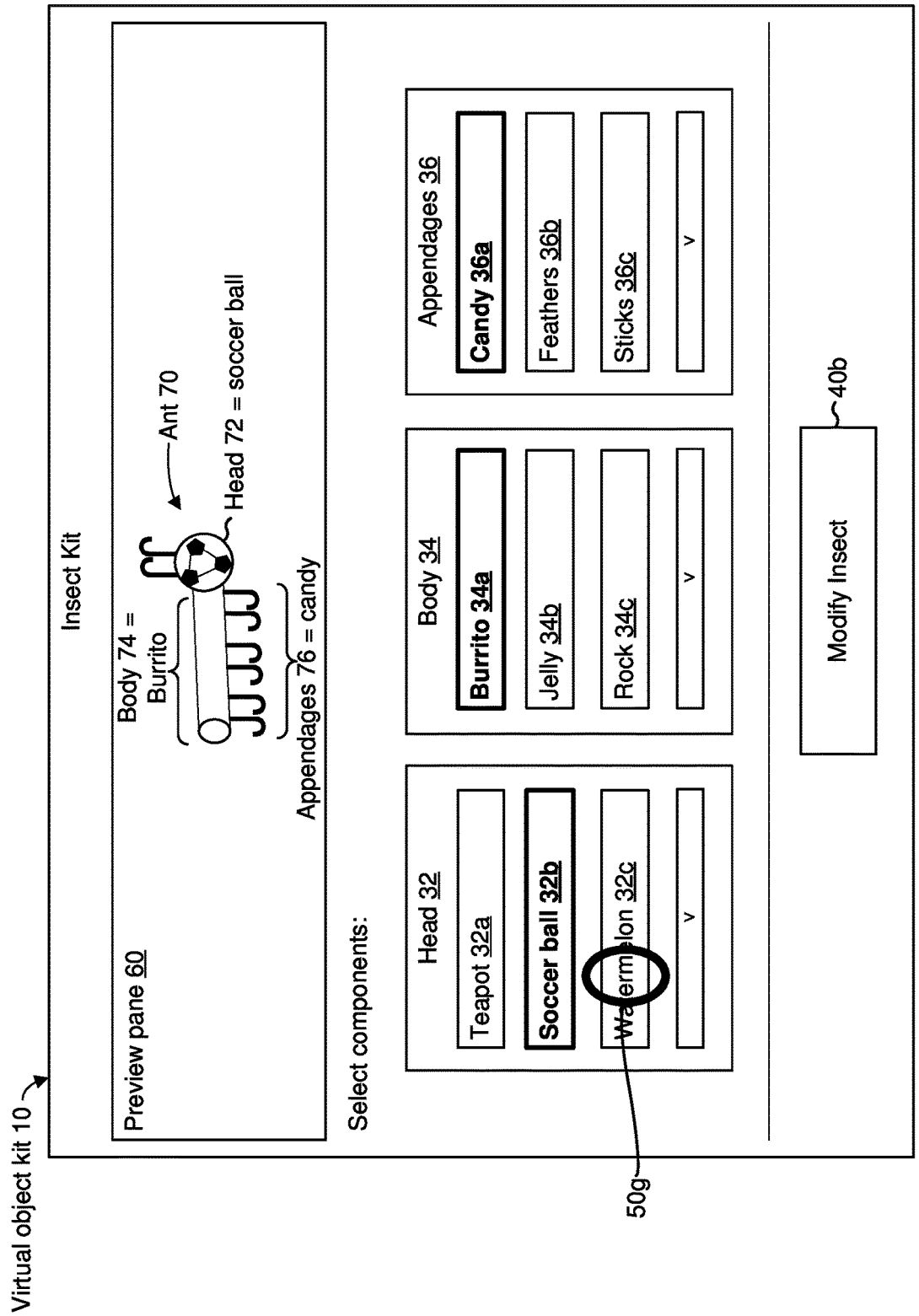
Figure 10:
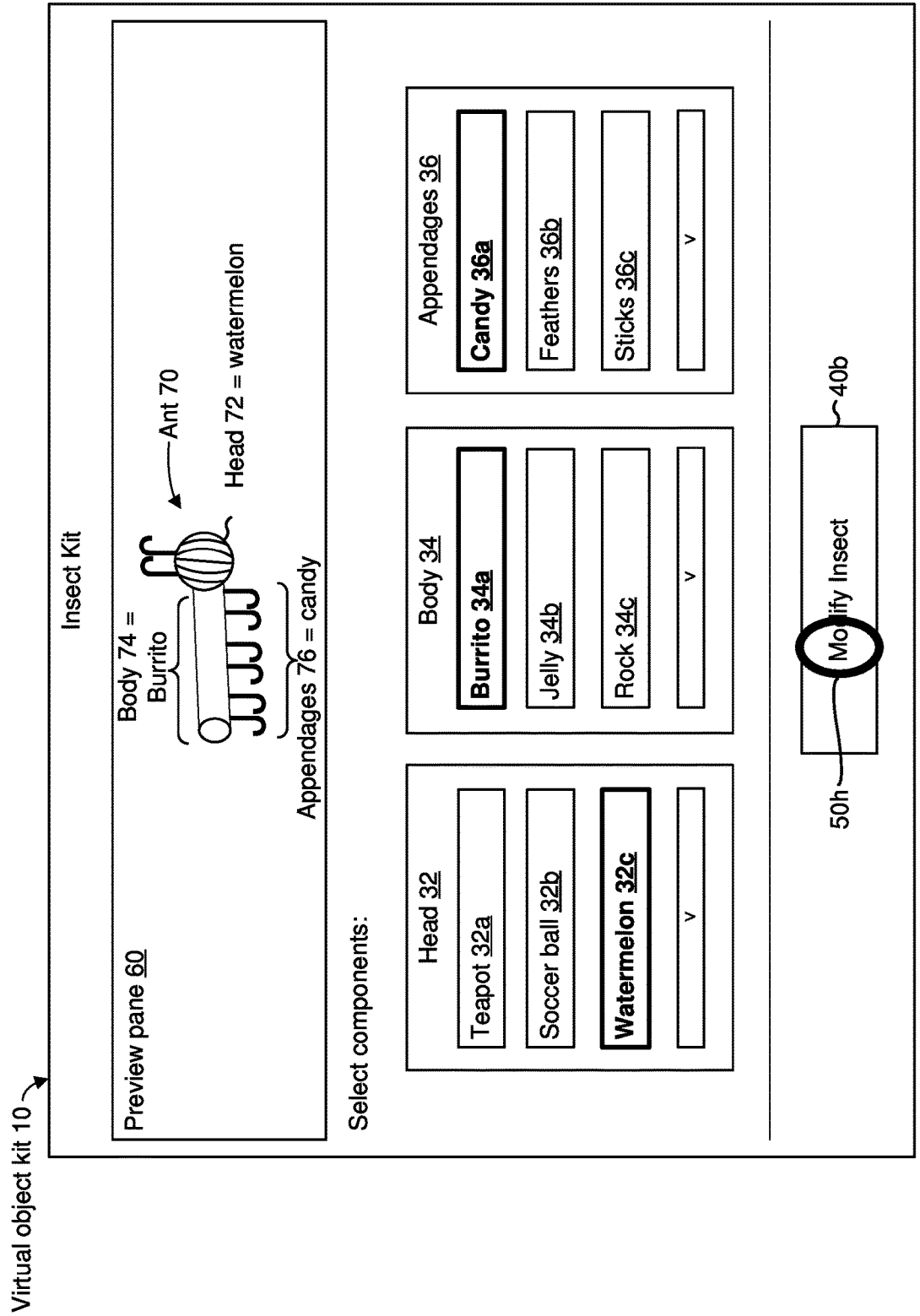
Figure 1P:
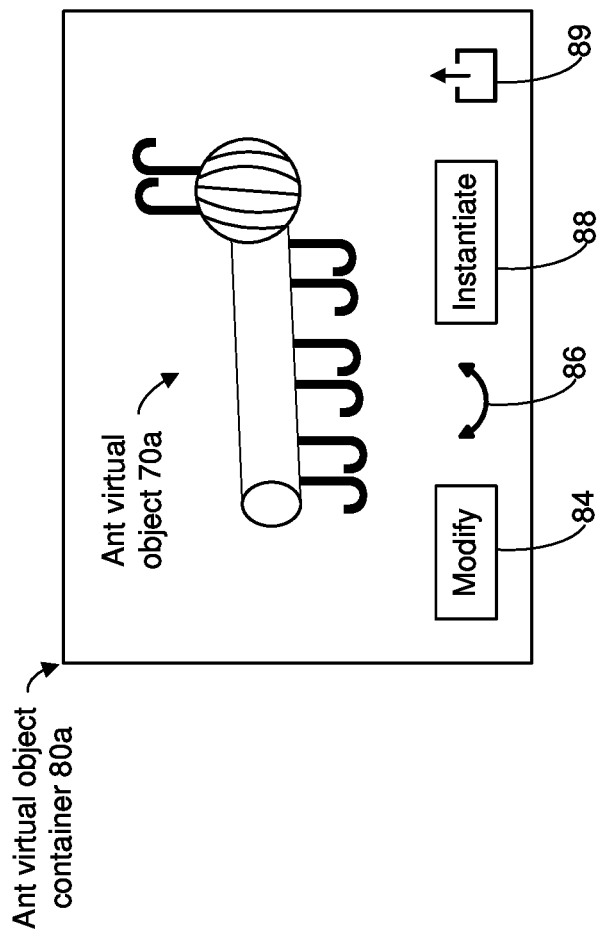
FIGS. 1P-1Q are diagrams of an example virtual object container in accordance with some implementations.

FIG. 1N illustrates a user input 50*g* selecting the watermelon affordance 32*c*. The user input 50*g* corresponds to a request to change the head 72 of the ant virtual object 70 from the soccer ball to a watermelon. In FIG. 1O, the preview pane 60 displays the ant virtual object 70 with a watermelon as the head 72. FIG. 1O also illustrates a user input 50*h* that corresponds to a request to accept the changes shown in the preview pane 60. FIG. 1P illustrates a modified ant virtual object container 80*a* that includes a modified ant virtual object 70*a*. As illustrated in FIG. 1P, the modified ant virtual object 70*a* has a watermelon as its head.

Figure 1Q:
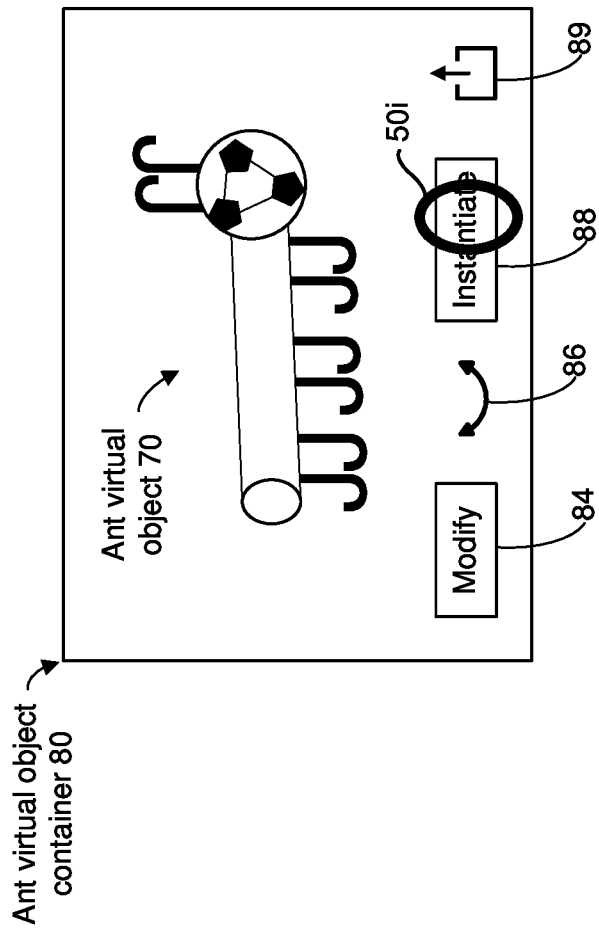

FIG. 1Q illustrates a user input 50*i* selecting the instantiate affordance 88. The user input 50*i* corresponds to a request to instantiate the ant virtual object 70 in an emergent content container where the ant virtual object 70 performs actions that satisfy an objective.

Figure 1R:
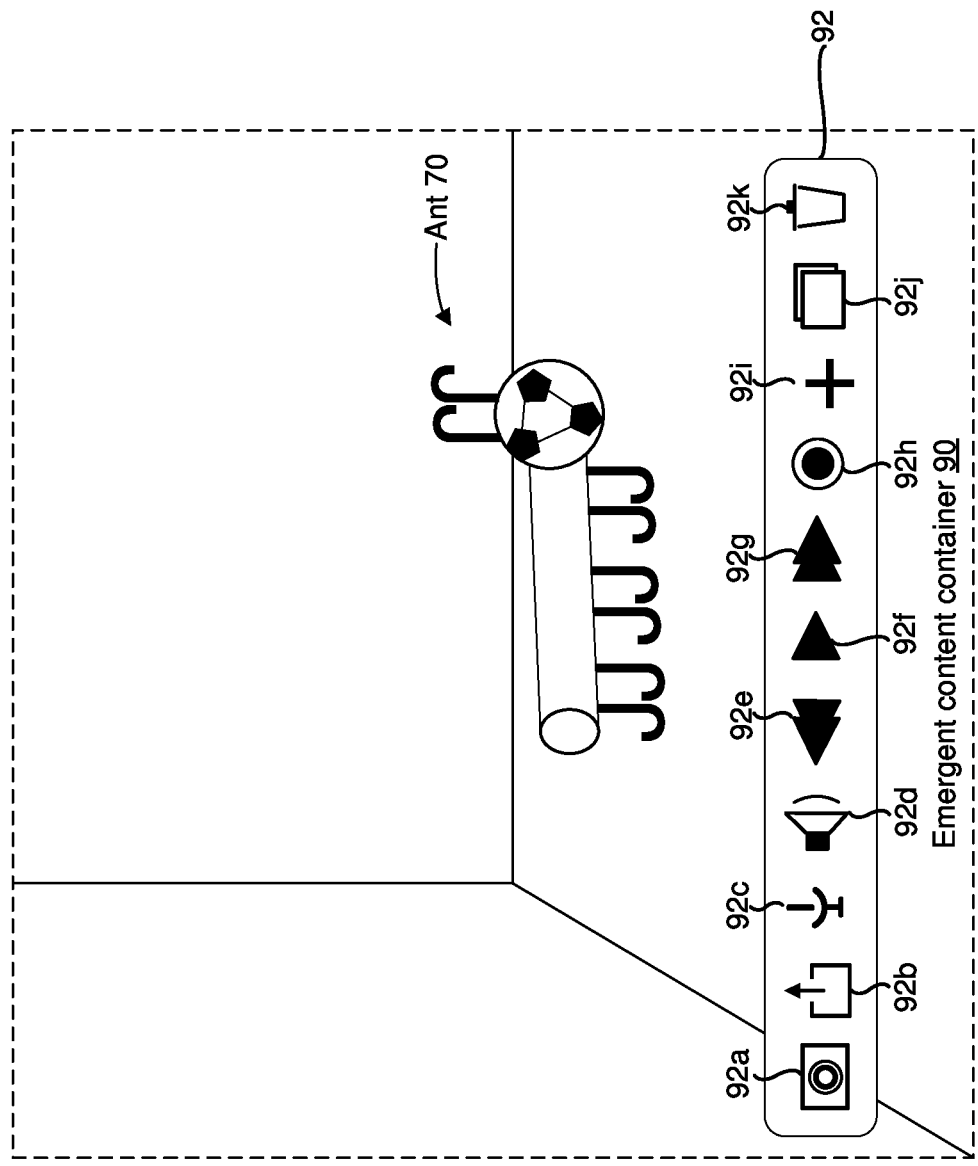
FIG. 1R is a diagram of an example virtual object instantiated in an example emergent content container in accordance with some implementations.

FIG. 1R illustrates an emergent content container 90 that includes the ant virtual object 70. In some implementations, the emergent content container 90 includes a CGR environment in which the ant virtual object 70 performs one or more actions (e.g., a sequence of actions) that satisfy one or more objectives (e.g., a set of objectives) of the ant virtual object 70. In some implementations, the CGR environment corresponds to a physical environment (e.g., the CGR environment is an augmentation of the physical environment). In some implementations, the CGR environment corresponds to a simulated environment (e.g., a fictitious environment).

In some implementations, the emergent content container 90 is associated with an emergent content engine that generates one or more objectives for the ant virtual object 70. In some implementations, the objectives trigger plots and/or storylines for the ant virtual object 70. In some implementations, the emergent content container 90 is associated with a virtual object engine that generates one or more actions for the ant virtual object 70.

As illustrated in FIG. 1R, the emergent content container 90 includes various container affordances 92. In some implementations, the container affordances 92 are grouped into a container affordance bar. In various implementations, the container affordances 92 allow various operations to be performed in relation to the emergent content container 90. For example, in some implementations, the container affordances 92 include a screen capture affordance 92*a* which, in response to being selected, captures an image of the emergent content container 90. In some implementations, the container affordances 92 include a share affordance 92*b* which, in response to being selected, provides options to share the emergent content container 90 with other devices (e.g., other devices of the same user and/or other devices of other users).

In some implementations, the container affordances 92 include a microphone (mic) affordance 92*c* which, in response to being selected, allows the user of a device to interact with the virtual objects that are instantiated in the emergent content container 90. For example, in some implementations, in response to detecting a selection of the mic affordance 92*c*, the emergent content container 90 receives an audio input. In such implementations, the emergent content container 90 causes the virtual objects that are instantiated in the emergent content container 90 to respond to the audio input. For example, the emergent content container 90 changes the actions that the instantiated virtual objects perform in response to the audio input.

In some implementations, the container affordances 92 include a speaker affordance 92*d* that, when selected, allows the user of the device to control a volume associated with the emergent content container 90 (e.g., so that the user can listen to dialogues recited by the virtual objects instantiated in the emergent content container 90).

In some implementations, the container affordances 92 include content playback affordances such as a rewind affordance 92*e*, a play affordance 92*f* and a fast forward affordance 92*g*. In some implementations, a selection of the play affordance 92*f* causes the emergent content container 90 to transition from an edit mode to a play mode in which the ant virtual object 70 starts performing actions. In some implementations, the rewind affordance 92*e*, when selected, causes the content displayed by the emergent content container 90 to be rewound. In some implementations, the fast forward affordance 92*g*, when selected, causes the content displayed by the emergent content container 90 to be fastforwarded. In some implementations, the container affordances 92 include a record affordance 92h that, when selected, causes the content displayed by the emergent content container 90 to be recorded.

In some implementations, the container affordances 92 include an add virtual object affordance 92i that, when selected, provides an option to add a virtual object to the emergent content container 90. In some implementations, the add virtual object affordance 92i allows additional instances of a virtual object that is already instantiated in the emergent content container 90 to be instantiated. In some implementations, the add virtual object affordance 92i allows an instance of a virtual object that is not currently instantiated in the emergent content container 90 to be instantiated.

In some implementations, the container affordances 92 include a duplicate virtual object affordance 92j that, when selected, provides an option to duplicate (e.g., replicate) a virtual object that is already instantiated in the emergent content container 90. In the example of FIG. 1R, a selection of the duplicate virtual object affordance 92j provides an option to duplicate the ant virtual object 70 that is already instantiated in the emergent content container 90.

In some implementations, the container affordances 92 include a delete virtual object affordance 92k that, when selected, provides an option to delete a virtual object that is instantiated in the emergent content container 90. In the example of FIG. 1R, a selection of the delete virtual object affordance 92k provides an option to delete the ant virtual object 70 that is already instantiated in the emergent content container 90.

Figure 1S:
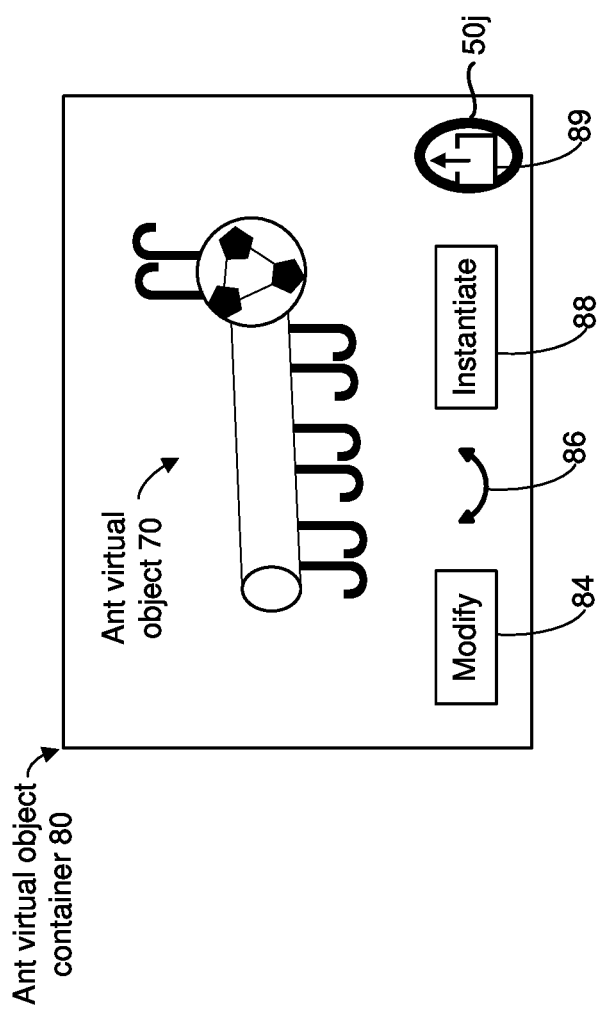
FIGS. 1S-1T are diagrams of the example virtual object container in accordance with some implementations.

FIG. 1S illustrates a user input 50j selecting the share affordance 89. The user input 50j corresponds to a request to share the ant virtual object 70.

Figure 1T:
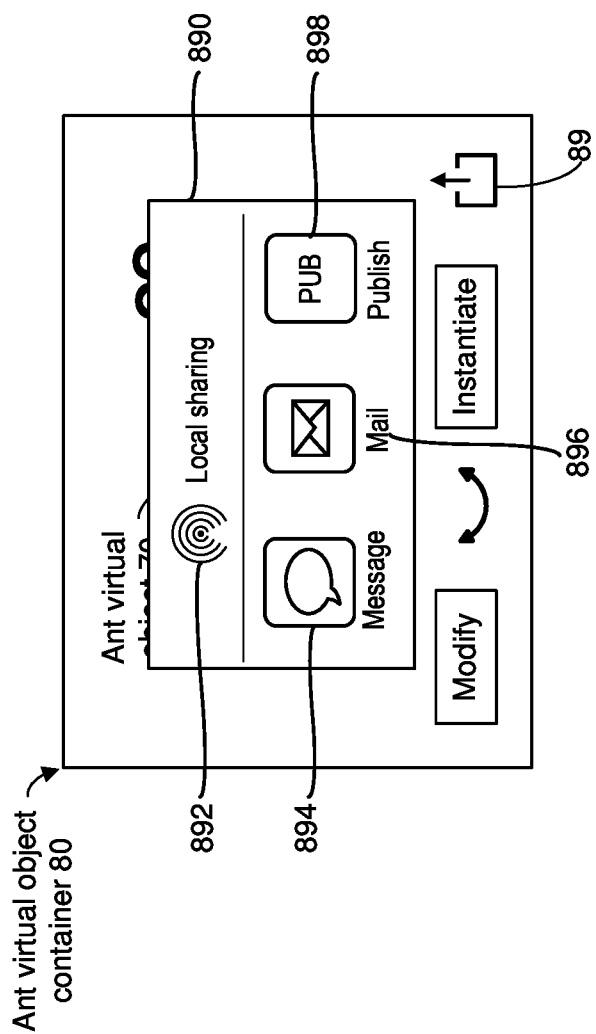

FIG. 1T illustrates sharing options 890 that are displayed in response to a selection of the share affordance 89. In the example of FIG. 1T, the sharing options 890 include a local sharing affordance 892, a messaging affordance 894, a mail affordance 896 and a publish affordance 898. The local sharing affordance 892, when selected, provides an option to share the ant virtual object 70 with nearby devices. The messaging affordance 894, when selected, provides an option to share the ant virtual object 70 via an instant message. The mail affordance 896, when selected, provides an option to share the ant virtual object 70 via e-mail. The publish affordance 898, when selected, provides an option to publish (e.g., distribute) the ant virtual object 70. In some implementations, the ant virtual object 70 is distributed via a digital asset store (e.g., a virtual object store, a digital media store, etc.).

Figure 1U:
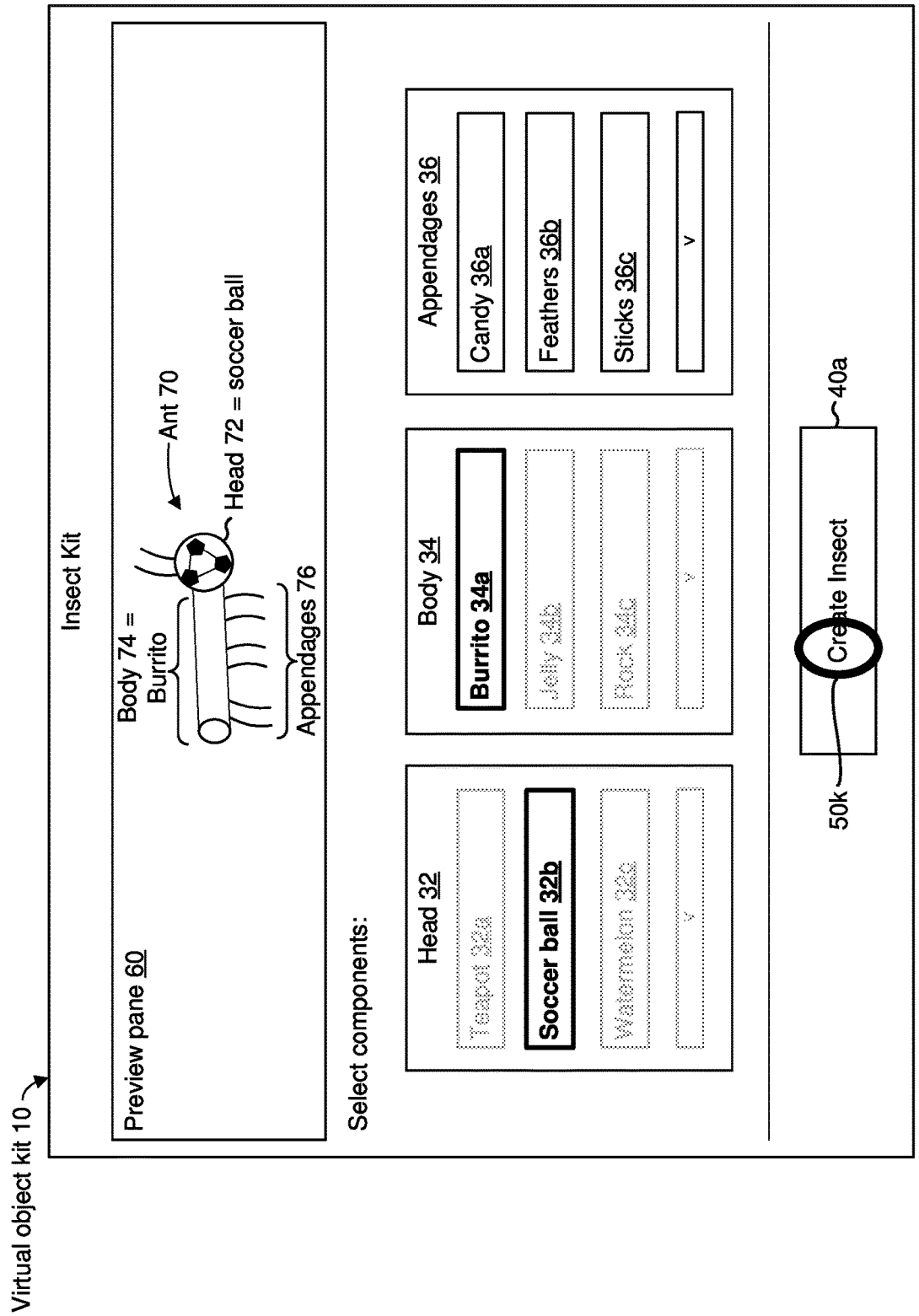
FIGS. 1U-1V are diagrams of the example virtual object kit in accordance with some implementations.

FIG. 1U illustrates a user input 50k selecting the create affordance 40a. In the example of FIG. 1U, no component has been selected from the appendages component group 36. More generally, in various implementations, a request to synthesize a virtual object is associated with an incomplete selection of components.

Figure 1V:
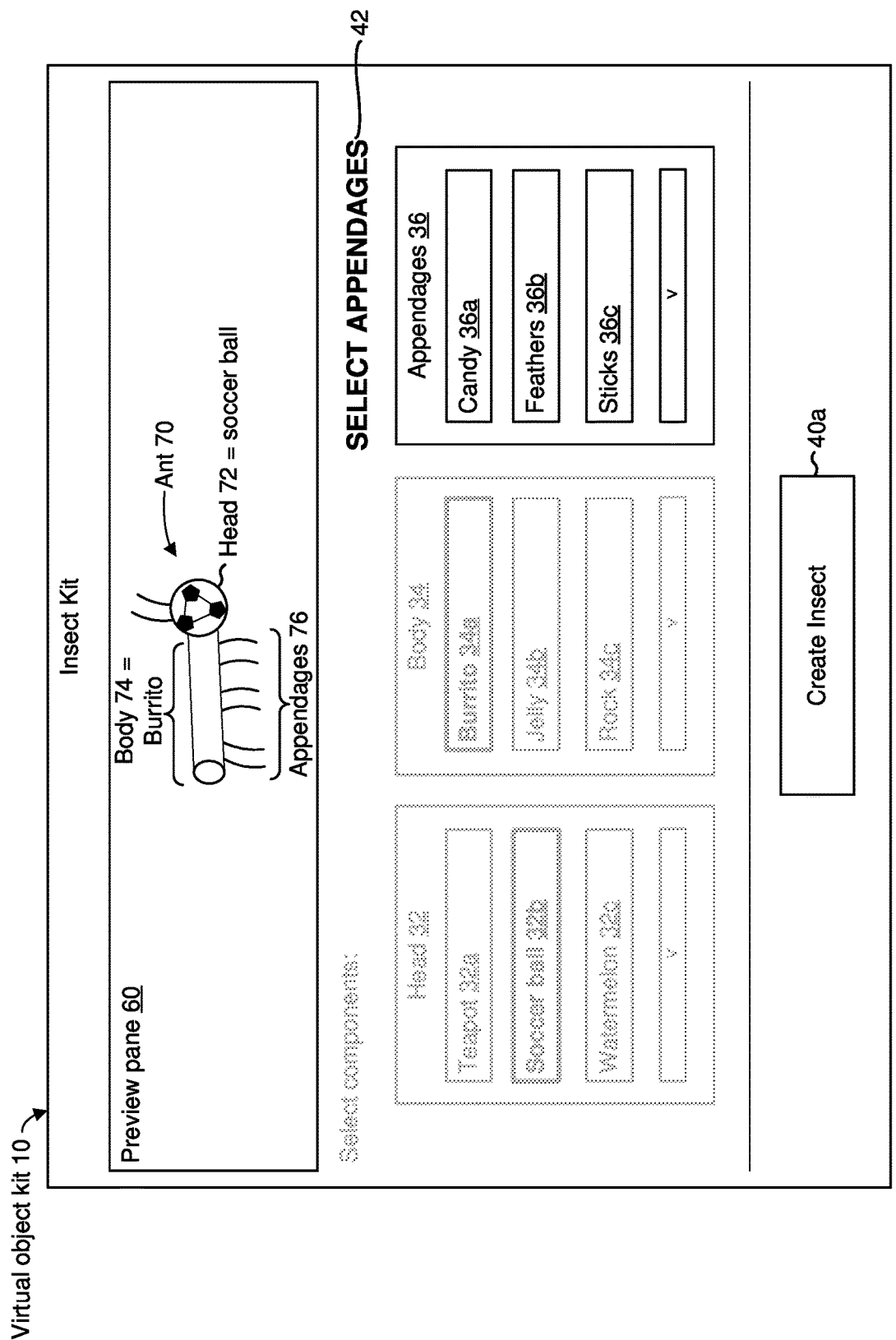

As illustrated in FIG. 1V, in some implementations, in response to no component being selected from the appendages component group 36, a prompt 42 is displayed requesting the user to select a component from the appendages component group 36. More generally, in various implementations, in response to an incomplete selection of components, a prompt is displayed to request the user to complete the selection of components.

Figure 1W:
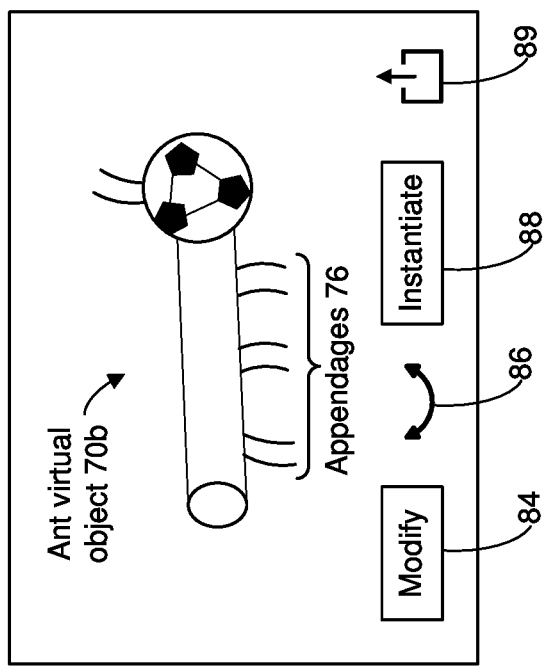
FIGS. 1W-1X are diagrams of the example virtual object container in accordance with some implementations.

As illustrated in FIG. 1W, in some implementations, in response to no component being selected from the appendages component group 36, a virtual object 70b is synthesized with default appendages 76. More generally, in various implementations, a default component from a group of components is selected in response to no component from that particular group being selected.

Figure 1X:
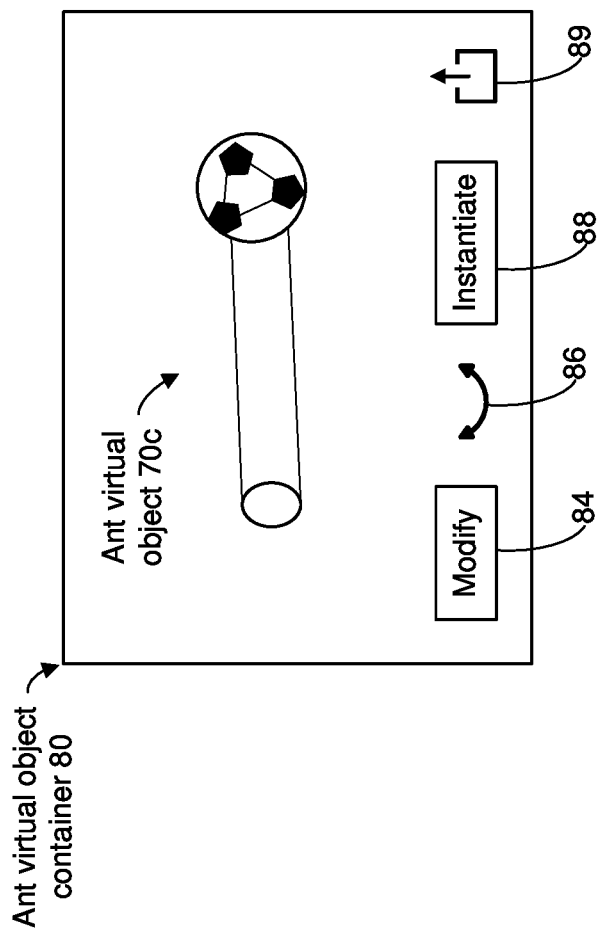

As illustrated in FIG. 1X, in some implementations, in response to no component being selected from the appendages component group 36, a virtual object 70c is synthesized with no appendages. More generally, in various implementations, in response to no component from a particular group of components being selected, a virtual object is synthesized with no component from that particular group of components.

Figure 1Y:
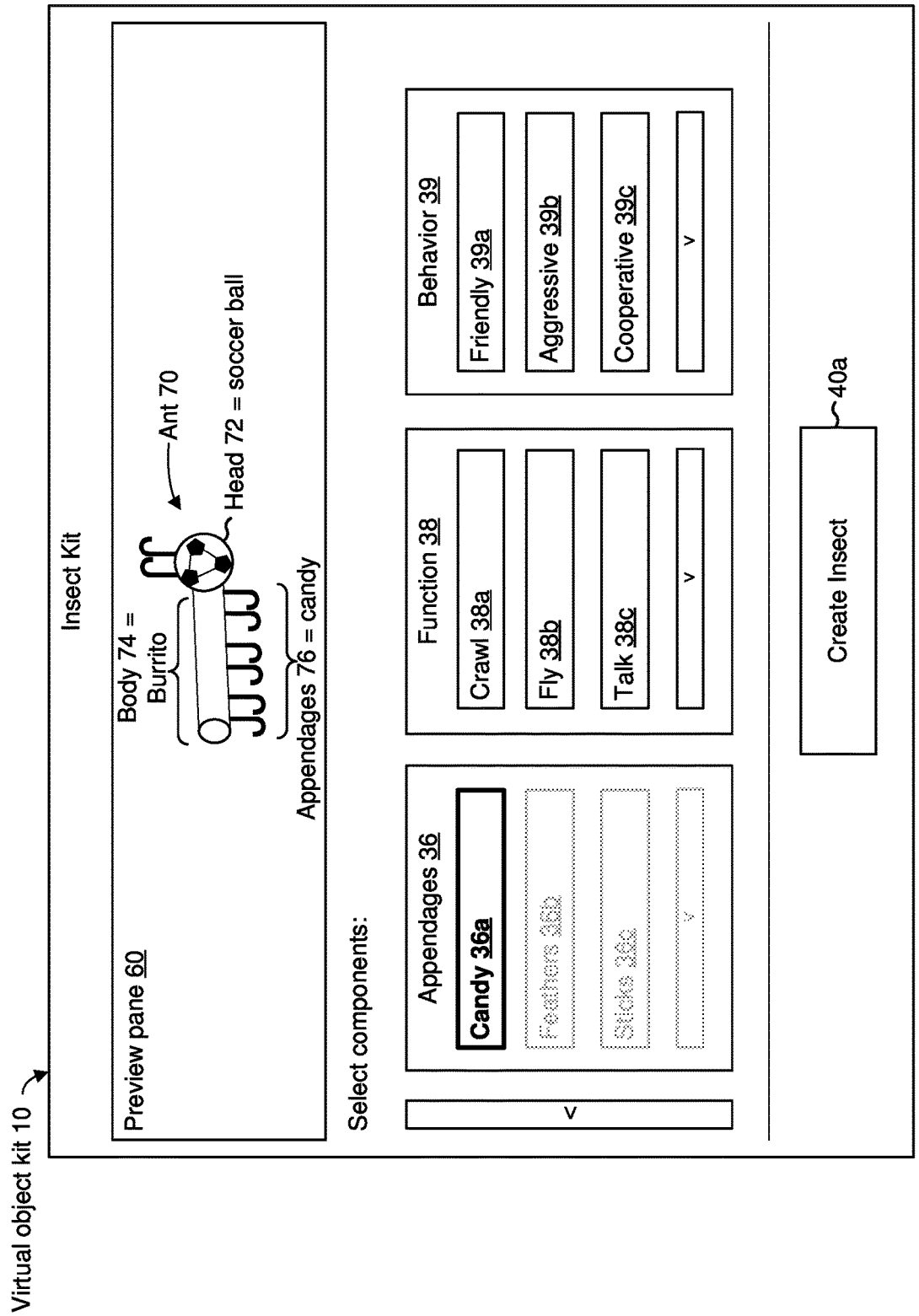

FIG. 1Y illustrates a functional component group 38 that includes various functions such as crawl 38a, fly 38b and talk 38c. As such, the virtual object kit 10 allows a user to select functional components for a virtual object. FIG. 1Y also illustrates a behavioral component group 39 that includes various behavioral components such as friendly behavior 39a, aggressive behavior 39b and cooperative behavior 39c. As such the virtual object kit 10 allows a user to select behavioral components for a virtual object.

Figure 1Z:
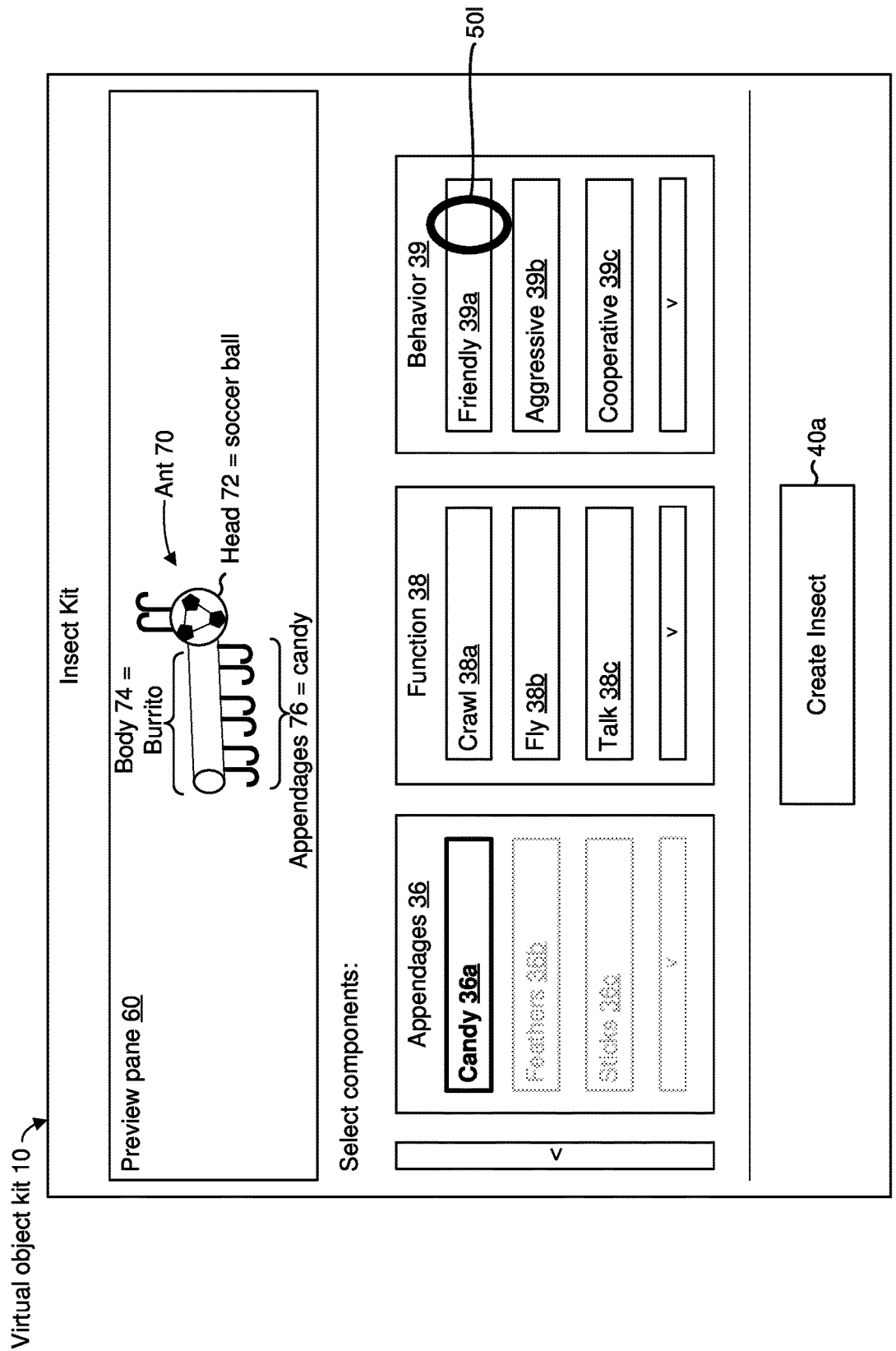
Figure 1A:
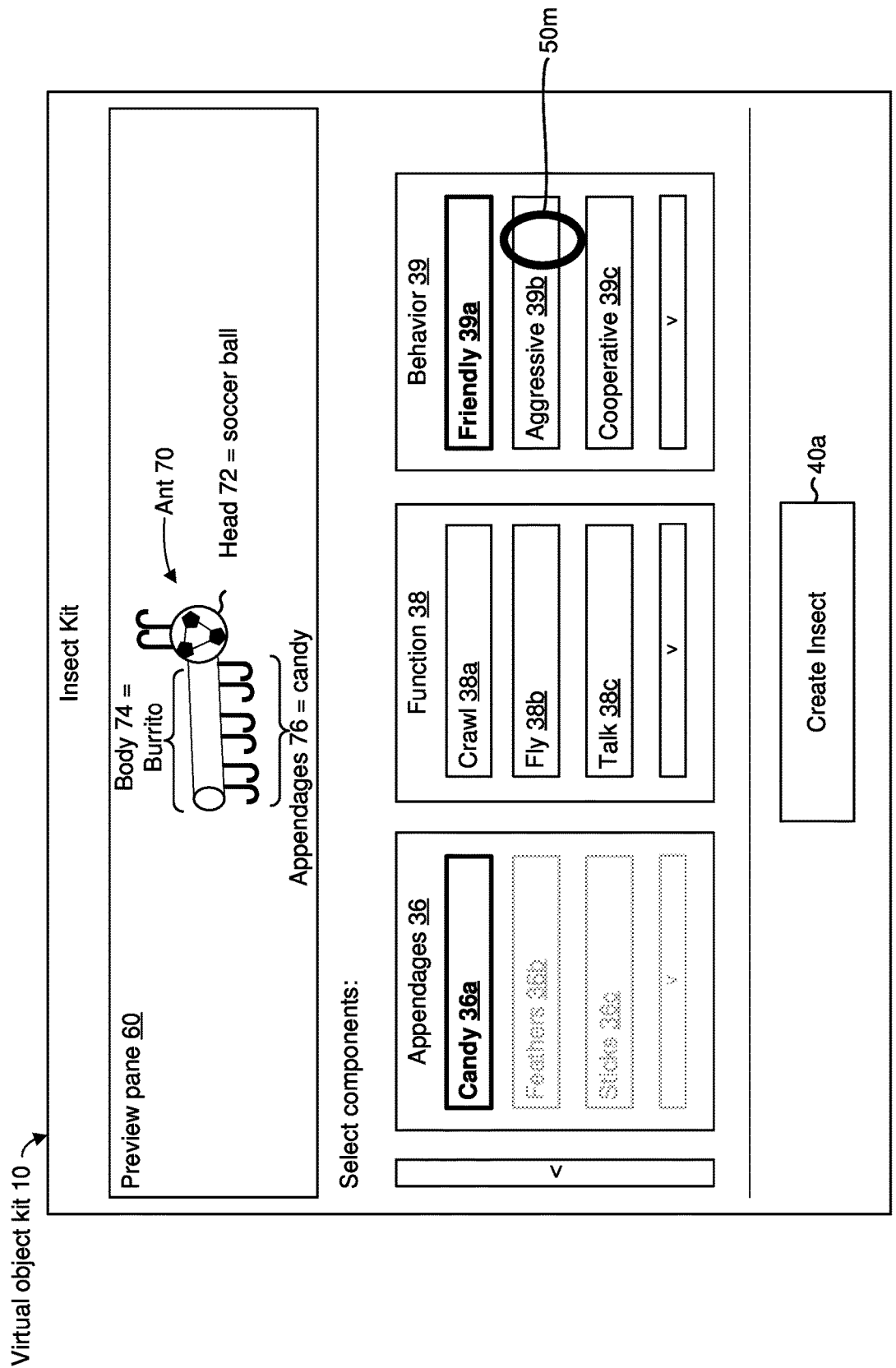
Figure 1A:
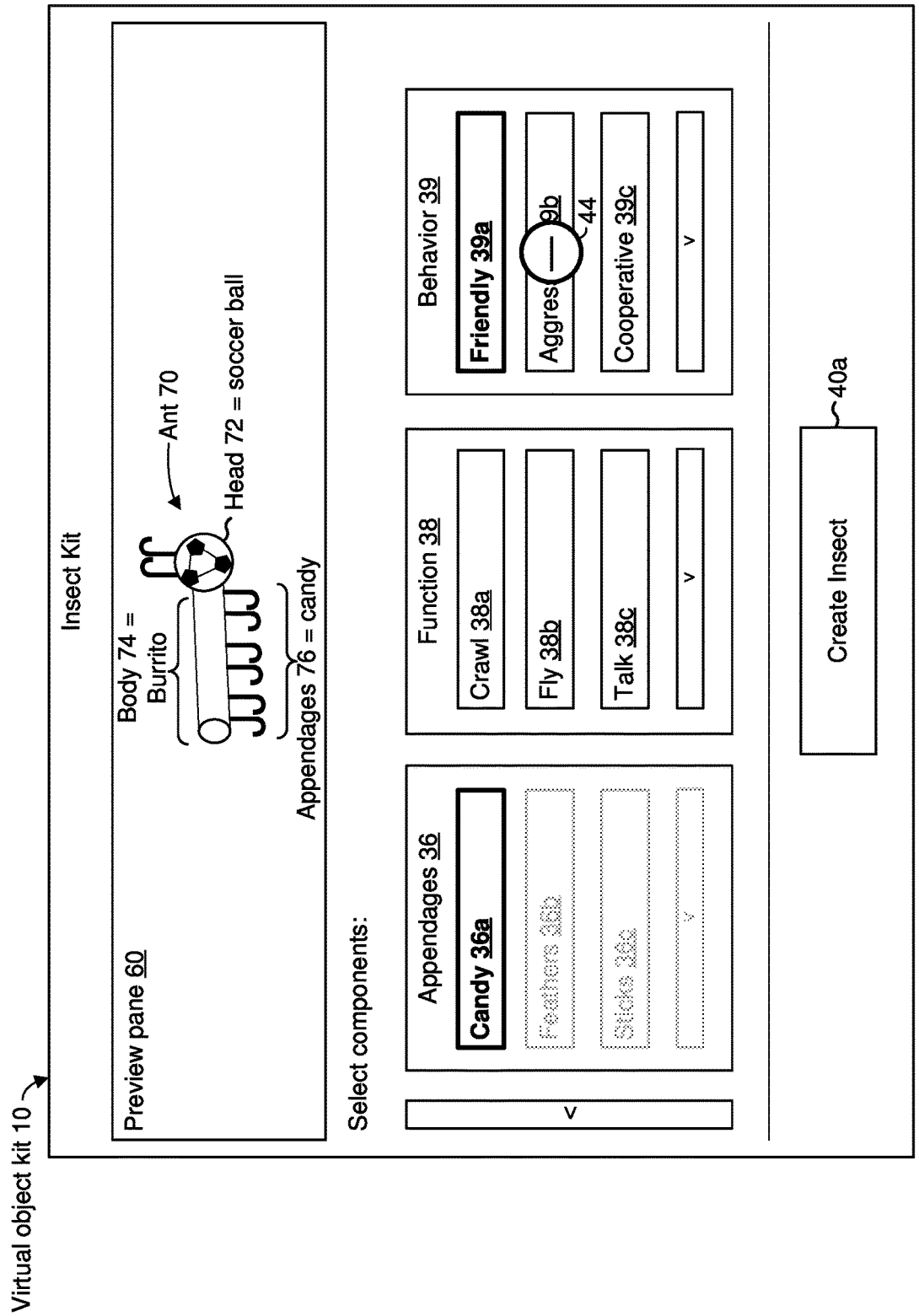
Figure 1A:
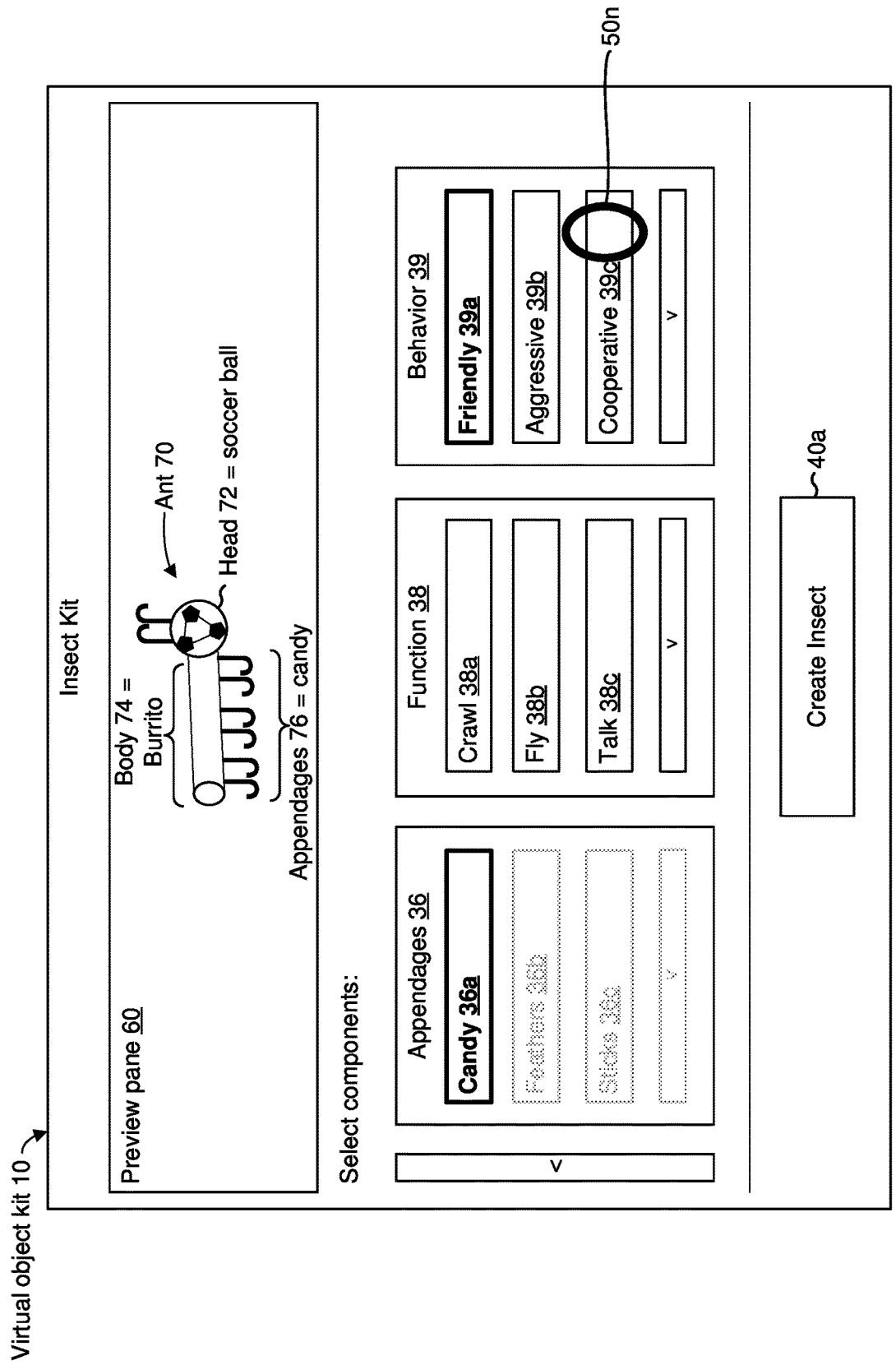
Figure 1A:
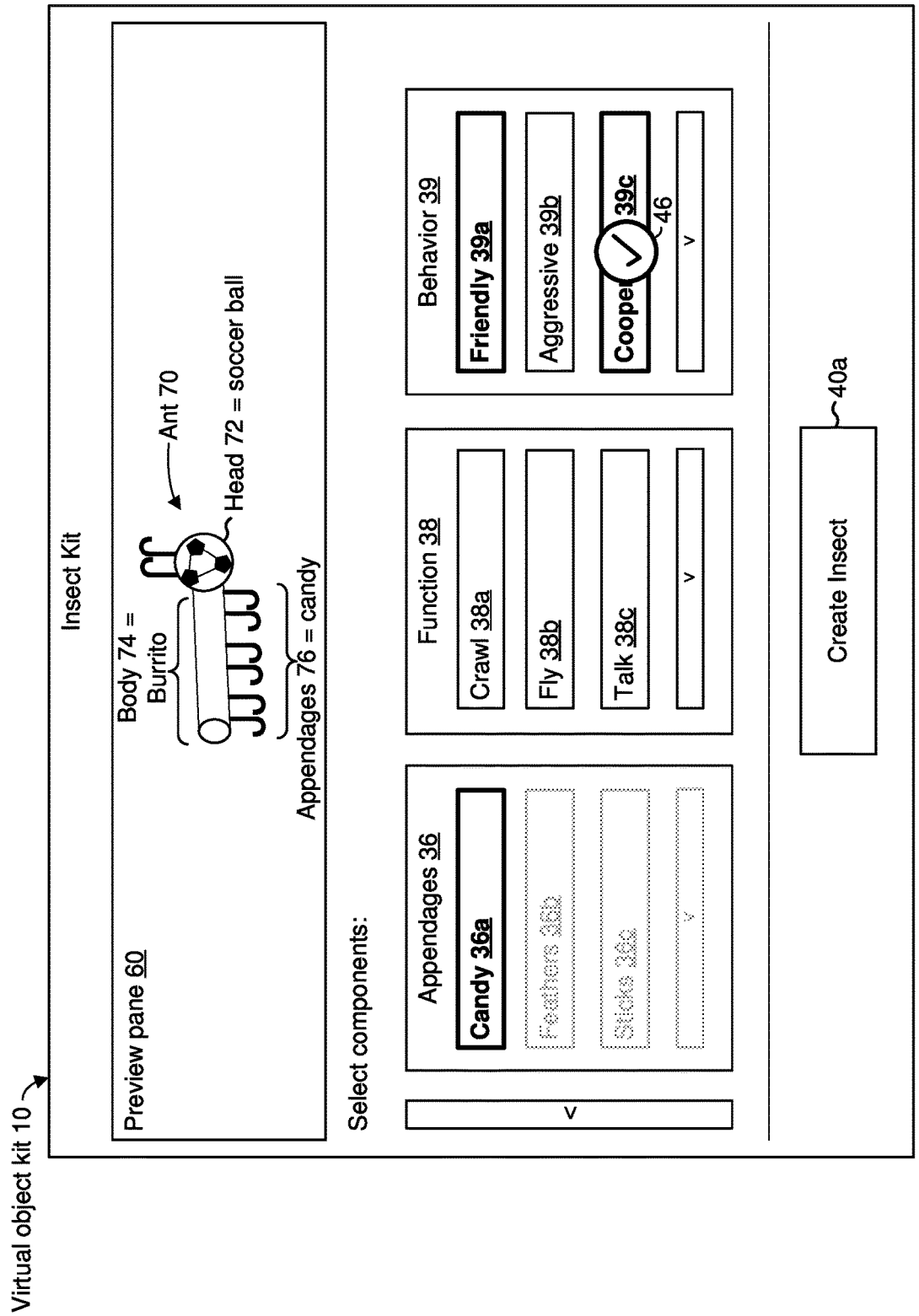
Figure 1A:
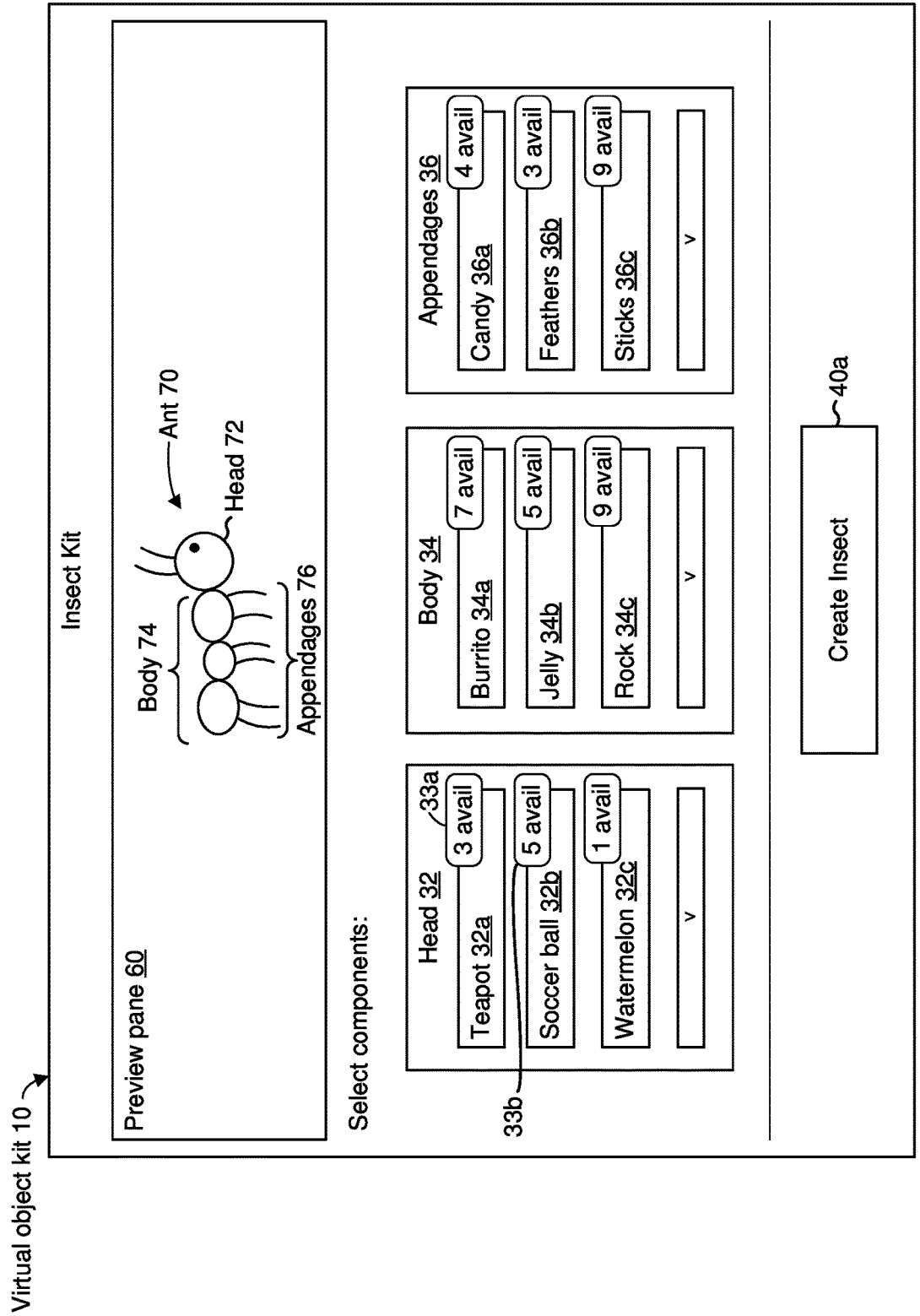
Figure 1A:
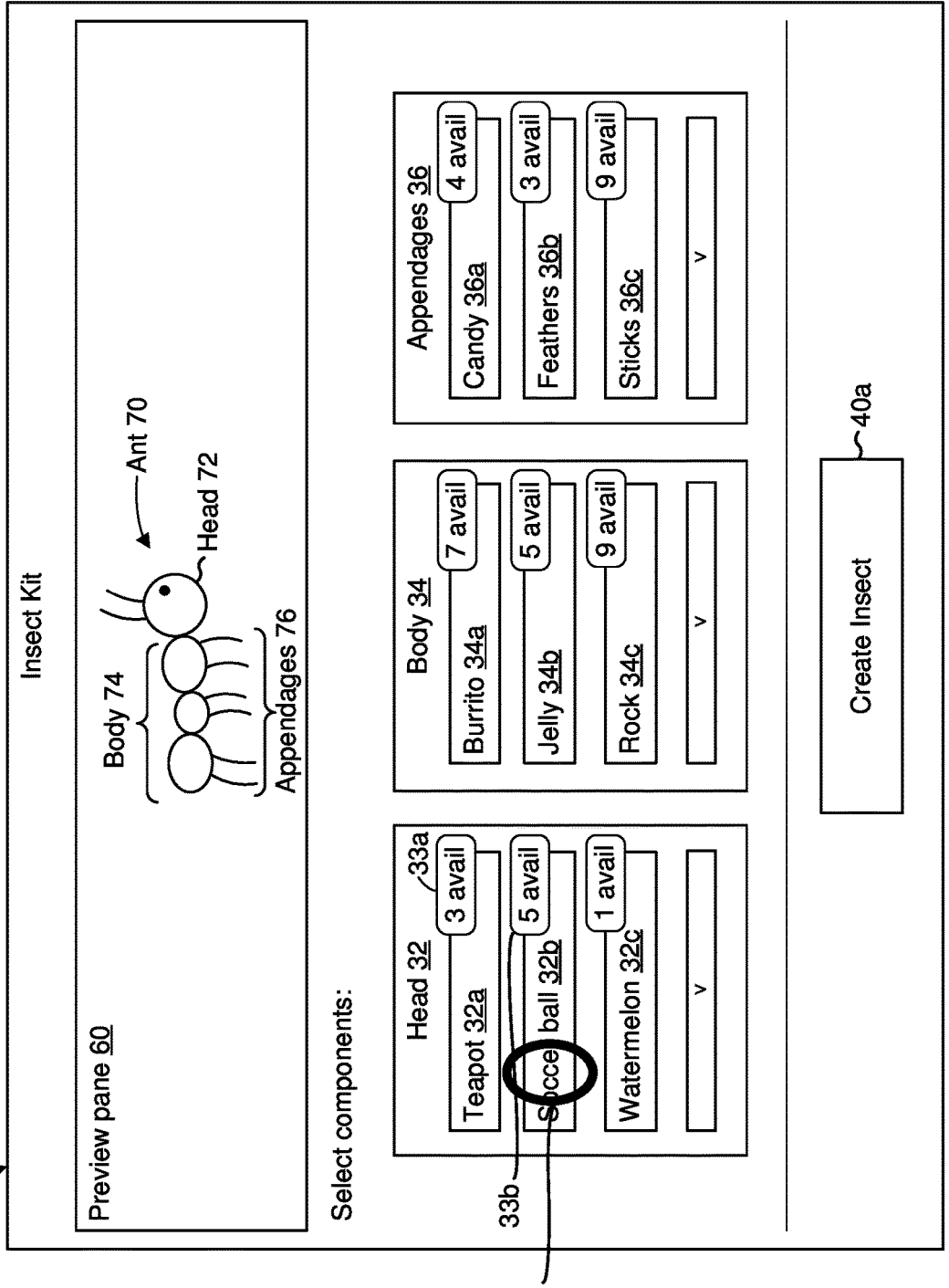
Figure 1A:
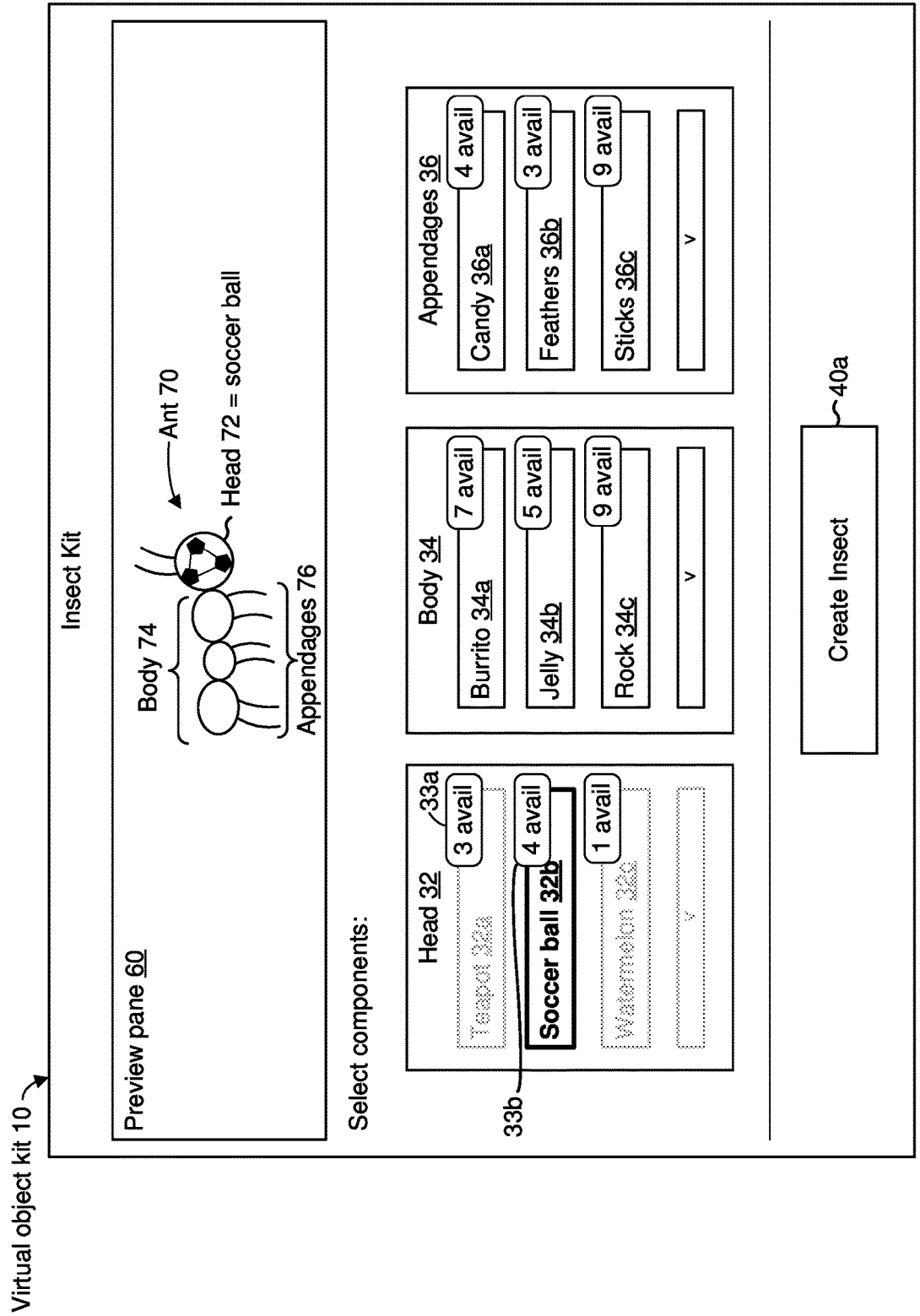
Figure 1A:
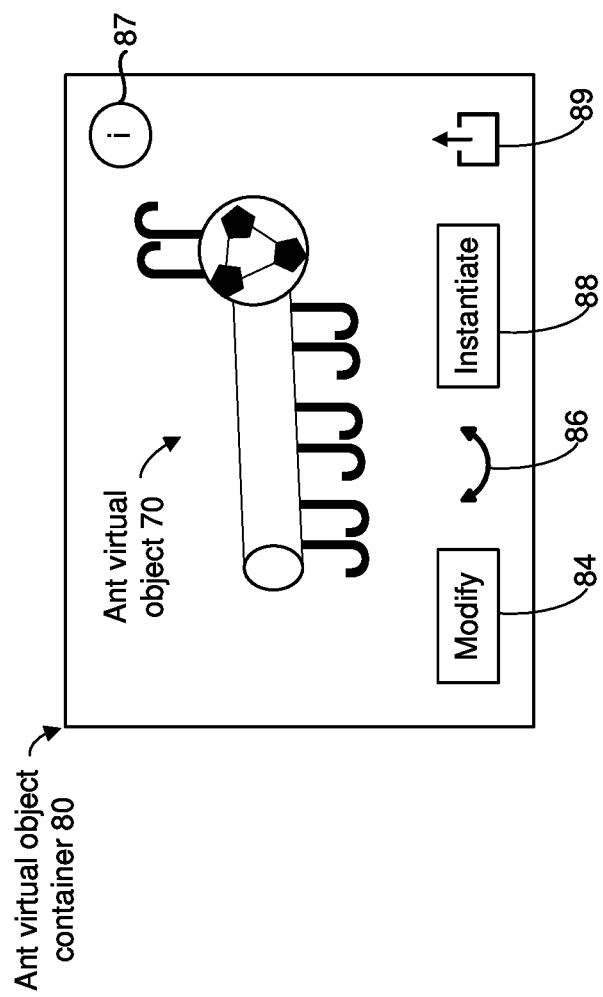
Figure 1A:
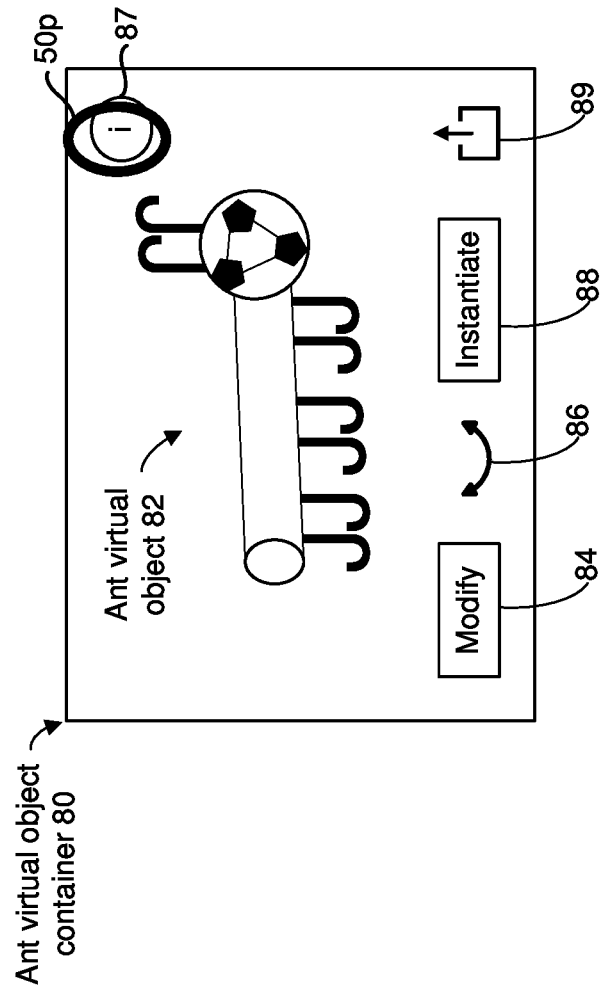
Figure 1A:
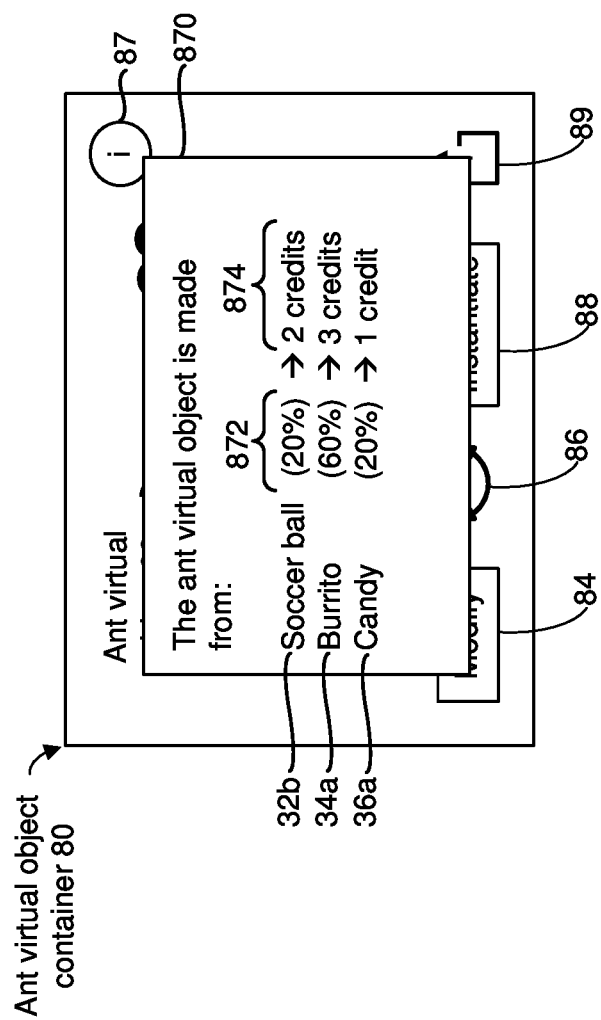
Figure 1A:
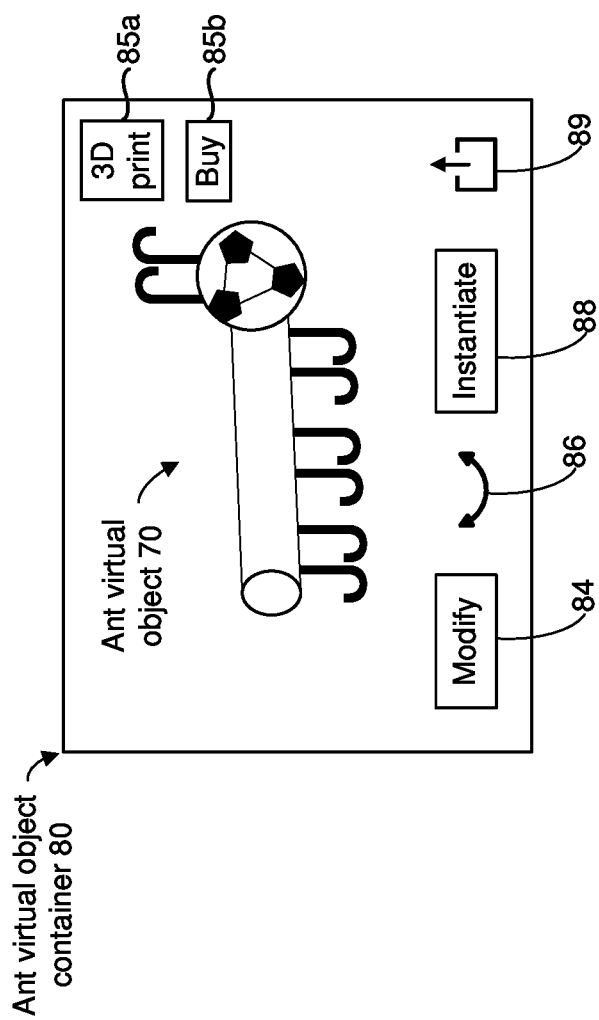
Figure 1A:
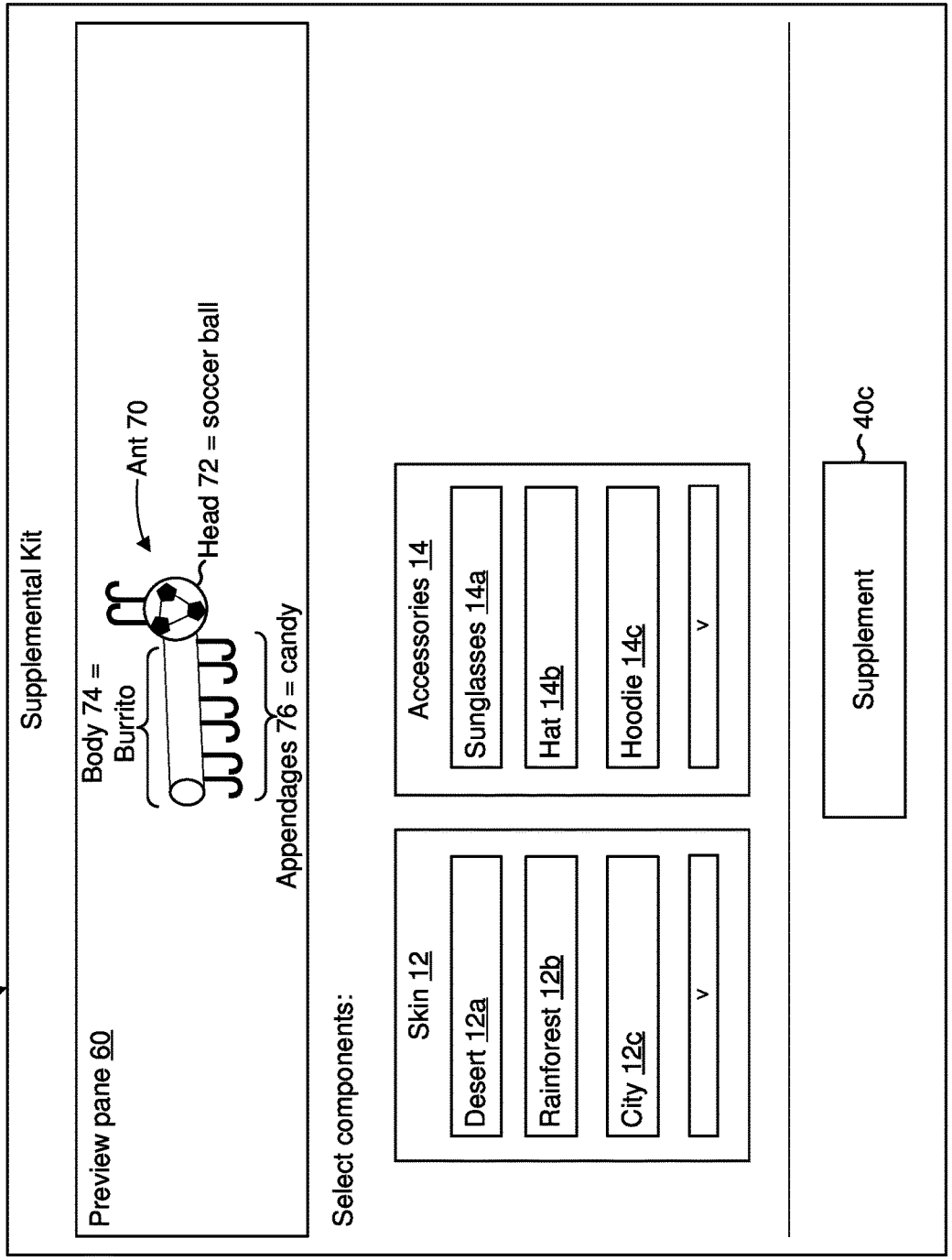

FIG. 1Z-1AB illustrate a sequence in which the virtual object kit 10 prevents the user from selecting components that are inconsistent with each other. For example, FIG. 1Z illustrates a user input 50l selecting friendly behavior 39a. FIG. 1AA illustrates a user input 50m selecting aggressive behavior 39b. FIG. 1AB illustrates a prompt 44 indicating that the selection of aggressive behavior 39b is inconsistent with a previous selection. In the example of FIG. 1AB, the selection of aggressive behavior 39b is inconsistent with the previous selection of friendly behavior 39a.

FIGS. 1AC-1AD illustrate a sequence in which the virtual object kit 10 indicates that a selection of a component is consistent with previous selections of components. For example, FIG. 1AC illustrates a user input 50n selecting the cooperative behavior 39c. FIG. 1AD illustrates a prompt 46 indicating that the selection of the cooperative behavior 39c is consistent with previous selections of components. In the example of FIG. 1AD, the selection of cooperative behavior 39c is consistent with the previous selection of friendly behavior 39a in FIG. 1Z.

FIGS. 1AE-1G illustrate a sequence in which some components are associated with a degree of scarcity. FIG. 1AE illustrates that some components are associated with an availability indicator which indicates the number of instances that are available. In the example of FIG. 1AE, the teapot affordance 32a is associated with a teapot availability indicator 33a indicating that there are three teapots available. Similarly, the soccer ball affordance is associated with a soccer ball availability indicator 33b indicating that there are five soccer balls available. As illustrated in FIG. 1AE, in some implementations, the availabilities of components varies. For example, there are more rocks and sticks available than watermelon.

FIG. 1AF illustrates a user input 50o selecting the soccer ball affordance 32b. The user input 50o corresponds to a request to utilize a soccer ball as the head 72 of the ant virtual object 70. Prior to the user input 50o, there were five soccer balls available. As illustrated in FIG. 1AG, after the user input 50o, there are four soccer balls remaining. As such, as illustrated in FIG. 1AG, the soccer ball availability indicator 33b is updated to indicate there are four soccer balls remaining.

FIGS. 1AH-1AJ illustrate a sequence in which the ant virtual object 70 is associated with contribution information indicating the make-up of the ant virtual object 70. FIG. 1AH illustrates an ant virtual object container 80 that includes an information affordance 87. In some implementations, the information affordance 87, when selected, displays contribution information regarding the ant virtual object 70.

FIG. 1AI illustrates a user input 50p selecting the information affordance 87. The user input 50p corresponds to a request to display contribution information regarding the ant virtual object 70.

FIG. 1AJ illustrates contribution information 870 associated with the ant virtual object 70. In various implementations, the contribution information 870 indicates a composition (e.g., make-up) of the ant virtual object 70. For example, in some implementations, the contribution information 870 includes contribution percentages 872. In the example of FIG. 1AJ, the contribution percentages 872 indicate that the ant virtual object 70 is 20% soccer ball, 60% burrito and 20% candy. As shown in FIG. 1AJ, in some implementations, the contribution information 870 indicates contribution credits 874 distributed (e.g., credited/awarded) to owners of components that were used to synthesize the ant virtual object 70. In the example of FIG. 1AJ, 2 credits were allocated to an entity that owned (e.g., created) the soccer ball component, 3 credits were allocated to an entity that owned the burrito component, and one credit was allocated to an entity that created the candy component.

Referring to FIG. 1AK, in some implementations, the ant virtual object container 80 includes affordances that allow the user to obtain a physical manifestation of the ant virtual object 70. For example, in some implementations, the ant virtual object container 80 includes a 3D print affordance 85a that, when selected, causes a 3D printer to build a physical representation of the ant virtual object 70. In some implementations, the ant virtual object container 80 includes a buy affordance 85b that allows the user to buy (e.g., purchase) a physical manifestation (e.g., a physical model) of the ant virtual object 70.

FIG. 1AL illustrates a virtual object supplemental kit 10a. In some implementations, the virtual object supplemental kit 10a provides options to supplement (e.g., augment or accessorize) a virtual object. In some implementations, the virtual object supplemental kit does not provide an option to synthesize a virtual object from scratch. In other words, in some implementations, the virtual object supplemental kit 10a does not include enough components to synthesize a virtual object.

In the example of FIG. 1AL, the virtual object supplemental kit 10a includes skin components 12. For example, the virtual object supplemental kit 10a includes a desert skin affordance 12a for applying a desert skin to the ant virtual object 70, a rainforest skin affordance 12b for applying a rainforest skin to the ant virtual object 70, and a city skin affordance 12c for applying a city skin to the ant virtual object 70.

In the example of FIG. 1AL, the virtual object supplemental kit 10a includes accessory components 14. For example, the virtual object supplemental kit 10a includes a sunglasses affordance 14a for accessorizing the ant virtual object 70 with a pair of sunglasses, a hat affordance 14b for putting a hat on the head 72 of the ant virtual object 70, and a hoodie affordance 14c for putting a hoodie on the body 74 of the ant virtual object 70.

In some implementations, changing a size of a virtual object triggers a change in the number of components that the virtual object is made from. In some implementations, increasing the size of the virtual object triggers an increase in the number of components that the virtual object is made from. For example, increasing the size of the ant virtual object 70 shown in FIG. 1R triggers an increase in the number of appendages 76 that the ant virtual object 70 includes. In some implementations, decreasing the size of the virtual object triggers a decrease in the number of components that the virtual object is made from. For example, decreasing the size of the ant virtual object 70 shown in FIG. 1R triggers a decrease in the number of appendages 76 that the ant virtual object 70 includes. More generally, in various implementations, a level of detail associated with a virtual object is a function of a size of the virtual object (e.g., increasing the size of the virtual object triggers a higher level of detail).

In various implementations, an objective of a virtual object is a function of the components of the virtual object. In some implementations, an objective of the ant virtual object 70 is a function of the physical components of the ant virtual object 70. For example, in some implementations, if the ant virtual object 70 is made from steel, then an objective of the ant virtual object 70 includes protecting the realm in which the ant virtual object 70 is instantiated. However, if the ant virtual object 70 is made from jelly, then an objective of the ant virtual object 70 includes running away from danger.

In various implementations, an action of a virtual object is a function of the components of the virtual object. For example, in some implementations, an action of the ant virtual object 70 is a function of the behavioral components of the ant virtual object 70. For example, in some implementations, if the ant virtual object 70 includes the friendly behavioral component, then an action of the ant virtual object 70 includes chatting with other virtual objects that are instantiated in the emergent content container 90. However, if the ant virtual object 70 includes the aggressive behavioral component, then an action of the ant virtual object 70 includes attacking other virtual objects that are instantiated in the emergent content container 90.

In various implementations, a virtual object represents a character or a variation thereof from fictional material such as a movie, a video game, a comic, and/or a novel. In various implementations, virtual objects represent things (e.g., tangible objects). For example, in some implementations, a virtual object represents equipment (e.g., machinery such as planes, tanks, robots, cars, etc.). In some implementations, a virtual object represents things (e.g., equipment) from fictional material. In some implementations, virtual objects represent physical articles from a physical environment.

In various implementations, a virtual object performs an action in order to satisfy (e.g., complete or achieve) an objective. In some implementations, a virtual object is associated with a particular objective, and the virtual object performs actions that improve the likelihood of satisfying that particular objective. In some implementations, the virtual objects are referred to as object representations, for example, because the virtual objects represent various objects (e.g., physical articles, or fictional articles). In some implementations, a virtual object representing a character is referred to as a character virtual object. In some implementations, a character virtual object performs actions to effectuate a character objective. In some implementations, a virtual object representing an equipment is referred to as an equipment virtual object. In some implementations, an equipment virtual object performs actions to effectuate an equipment objective. In some implementations, an objective effectuator representing an environment is referred to as an environmental virtual object. In some implementations, an environmental objective effectuator performs environmental actions to effectuate an environmental objective.

Figure 2A:
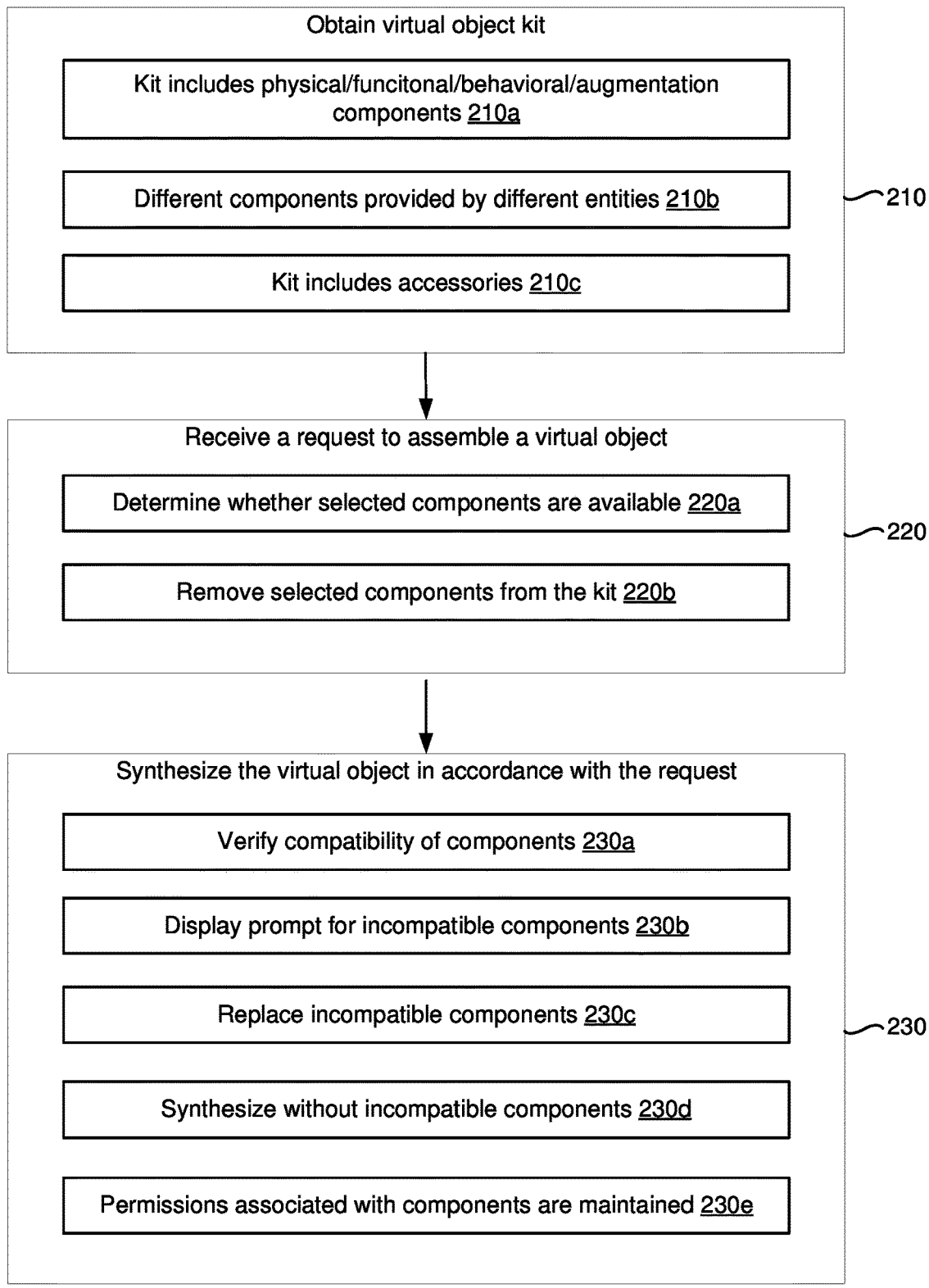
FIGS. 2A-2C are flowchart representations of a method of synthesizing a virtual object from a virtual object kit in accordance with some implementations.

FIG. 2A is a flowchart representation of a method 200 of synthesizing a virtual object from a virtual object kit. In various implementations, the method 200 is performed by a device with a display, a non-transitory memory and one or more processors coupled with the display and the non-transitory memory. In some implementations, the method 200 is performed by processing logic, including hardware, firmware, software, or a combination thereof. In some implementations, the method 200 is performed by a processor executing code stored in a non-transitory computer-readable medium (e.g., a memory). Briefly, in some implementations, the method 200 includes obtaining a virtual object kit, receiving a request to assemble a virtual object, and synthesizing the virtual object in accordance with the request.

As represented by block 210, in various implementations, the method 200 includes obtaining a virtual object kit (e.g., the virtual object kit 10 shown in FIG. 1A). In some implementations, the virtual object kit includes a set of virtual object templates (e.g., the set of virtual object templates 20 shown in FIG. 1A). In some implementations, the set of virtual object templates are of a particular virtual object type (e.g., the set of virtual object templates share a set of characteristics, for example, the set of virtual object templates 20 are for synthesizing insect virtual objects). In some implementations, the virtual object kit includes a plurality of groups of components (e.g., the groups of components 30 shown in FIG. 1A). In some implementations, each of the plurality of groups of components is associated with a particular portion of a virtual object (e.g., in the example of FIG. 1A, the head component group 32 is associated with a head portion of an insect virtual object, the body component group 34 is associated with a body portion of the insect virtual object, and the appendages component group 36 is associated with an appendages portion of the insect virtual object).

As represented by block 210a, in some implementations, at least one of the plurality of groups includes physical components (e.g., the head component group 32, the body component group 34 and the appendages component group 36 shown in FIG. 1A). In some implementations, physical components refer to components that determine a physical appearance of the virtual object (e.g., physical components define how the virtual object looks and/or feels). In some implementations, at least one of the plurality of groups includes functional components (e.g., the functional component group 38 shown in FIG. 1Y). In some implementations, functional components refer to components that determine a function of the virtual object (e.g., functional components define what the virtual object does). In some implementations, at least one of the plurality of groups includes behavioral components (e.g., the behavioral component group 39 shown in FIG. 1Y). In some implementations, behavioral components refer to components that determine a behavior of the virtual object. In some implementations, at least one of the plurality of groups includes augmentation components (e.g., the skin components 12 and/or the accessory components 14 shown in FIG. 1AL). In some implementations, augmentation components refer to components that augment (e.g., supplement) the virtual object.

As represented by block 210b, in some implementations, different components are provided by different entities (e.g., different contributors, different publishers and/or different users). For example, in some implementations, different components are created by different entities. Referring to the example of FIG. 1A, in some implementations, the teapot corresponding to the teapot affordance 32a is created by a first entity and the soccer ball corresponding to the soccer ball affordance 32b is create by a second entity. In various implementations, the virtual object kit includes components that are provided by different entities thereby allowing a user to synthesize a virtual object that is made from components created by different entities. As such, a user is not limited to assembling a virtual object from components that only the user created.

As represented by block 210c, in various implementations, the virtual object kit includes accessories. For example, in some implementations, the virtual object kit includes a virtual object supplemental kit (e.g., the virtual object supplemental kit 10a shown in FIG. 1AL) that includes the accessories (e.g., the accessory components 14 shown in FIG. 1AL).

As represented by block 220, in various implementations, the method 200 includes receiving a request to assemble a virtual object. In some implementations, the request includes a selection of components from at least some of the plurality of groups of components. In the example of FIG. 1J, the user input 50e selecting the create affordance 40a corresponds to a request to assemble the virtual object.

As represented by block 220a, in some implementations, the method 200 includes determining whether the selected components are available. In some implementations, the method 200 includes displaying a prompt to select alternative components in response to determining that at least some of the selected components are unavailable.

As represented by block 220b, in some implementations, the method 200 includes removing the selected components from the virtual object kit. In some implementations, there are a particular number of available instances for a component. In such implementations, the method 200 includes indicating that the available number of instances for the component decreased after the component was selected to assemble the virtual object. Referring to the example of FIGS. 1AE-1G, in response to the user input 50o, the soccer ball availability indicator 33b is updated to indicate that the number of available soccer balls decreased from 5 to 4.

As represented by block 230, in various implementations, the method 200 includes synthesizing the virtual object in accordance with the request (e.g., synthesizing the ant virtual object 70 shown in FIG. 1K). In various implementations, a set of actions that the virtual object performs in a CGR environment is a function of the components that the virtual object includes. As described herein, in some implementations, a virtual object engine generates the set of actions for the virtual object. In such implementations, the set of actions that the virtual object engine generates is a function of the components that the virtual object is made from.

As represented by block 230a, in some implementations, the method 200 includes verifying compatibility of the selected components. For example, in some implementations, the method 200 includes determining whether the selected components can be utilized to assemble a functioning virtual object. As represented by block 230b, in some implementations, the method 200 includes displaying a prompt to indicate a selection of incompatible components (e.g., the prompt 44 shown in FIG. 1AB). In some implementations, the prompt identifies the incompatible component. As represented by block 230c, in some implementations, the method 200 includes replacing the incompatible component(s) with default component(s). As represented by block 230d, in some implementations, the method 200 includes synthesizing the virtual object without the incompatible components (e.g., the virtual object does not include one of the components that are incompatible with each other).

As represented by block 230e, in some implementations, the method 200 includes maintaining permissions associated with respective components that are utilized to synthesize the virtual object. For example, in some implementations, each component is associated with a permission that defines whether/how the component can be distributed (e.g., the permission indicates whether the component can be copied).

Figure 2B:
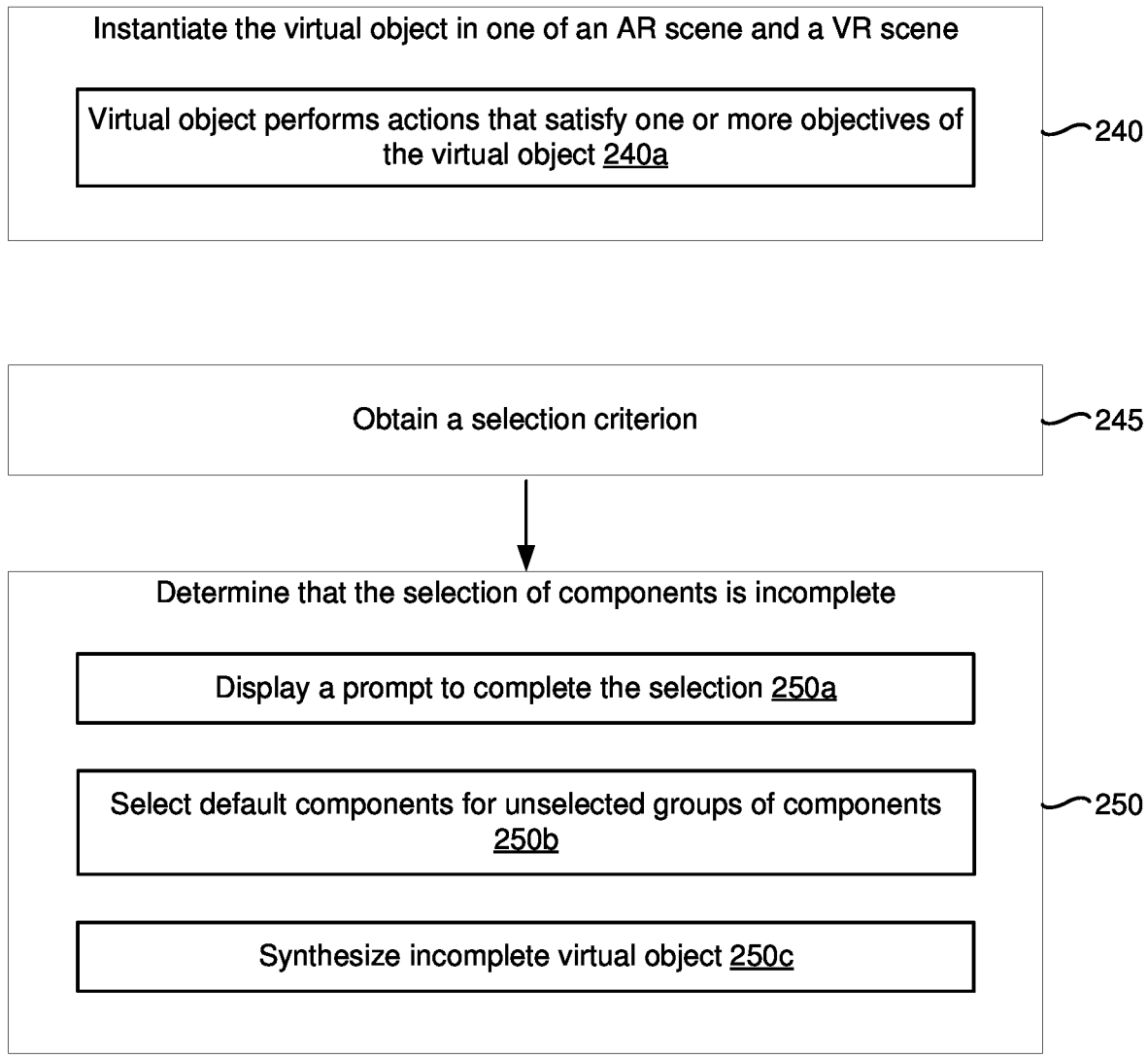

Referring to FIG. 2B, as represented by block 240, in some implementations, the method 200 includes instantiating the virtual object in one of an Augmented Reality (AR) environment and a Virtual Reality (VR) environment. For example, as illustrated in FIG. 1R, the ant virtual object 70 is instantiated in the emergent content container 90. As represented by block 240a, in some implementations, the virtual object performs one or more actions (e.g., a sequence of actions) that satisfy one or more objectives (e.g., a set of objectives) of the virtual object. In some implementations, the method 200 includes generating the actions and/or the objectives based on the components that the virtual object consists of.

As represented by block 245, in some implementations, the method 200 includes obtaining a selection criterion. In some implementations, the selection criterion indicates the groups of components from which at least one component must be selected in order to synthesize the virtual object. In some implementations, the selection criterion indicates compatible components. In some implementations, the selection criterion indicates incompatible components. In some implementations, the method 200 includes receiving the selection criterion from an entity that created the virtual object kit. In some implementations, the method 200 includes receiving the selection criterion from an entity that created one or more of the components in the virtual object kit. For example, in some implementations, some components are associated with a respective selection criterion indicating other compatible/incompatible components.

As represented by block 250a, in some implementations, the method 200 includes displaying a prompt to complete the selection. In some implementations, the prompt identifies a group of components from which a component must be selected in order to synthesize the virtual object. For example, displaying the prompt 42 shown in FIG. 1V.

As represented by block 250b, in some implementations, the method 200 includes selecting default components for unselected groups of components. For example, as illustrated in FIG. 1W, the ant virtual object 70b includes default appendages because no component was selected from the appendages component group 36 in FIG. 1U.

As represented by block 250c, in some implementations, the method 200 includes synthesizing an incomplete virtual object. For example, in some implementations, the method 200 includes synthesizing the virtual object without a portion that corresponds to an unselected group of components. For example, as illustrated in FIG. 1X, the ant virtual object 70c does not include appendages because no component was selected from the appendages component group 36 in FIG. 1U.

Figure 2C:
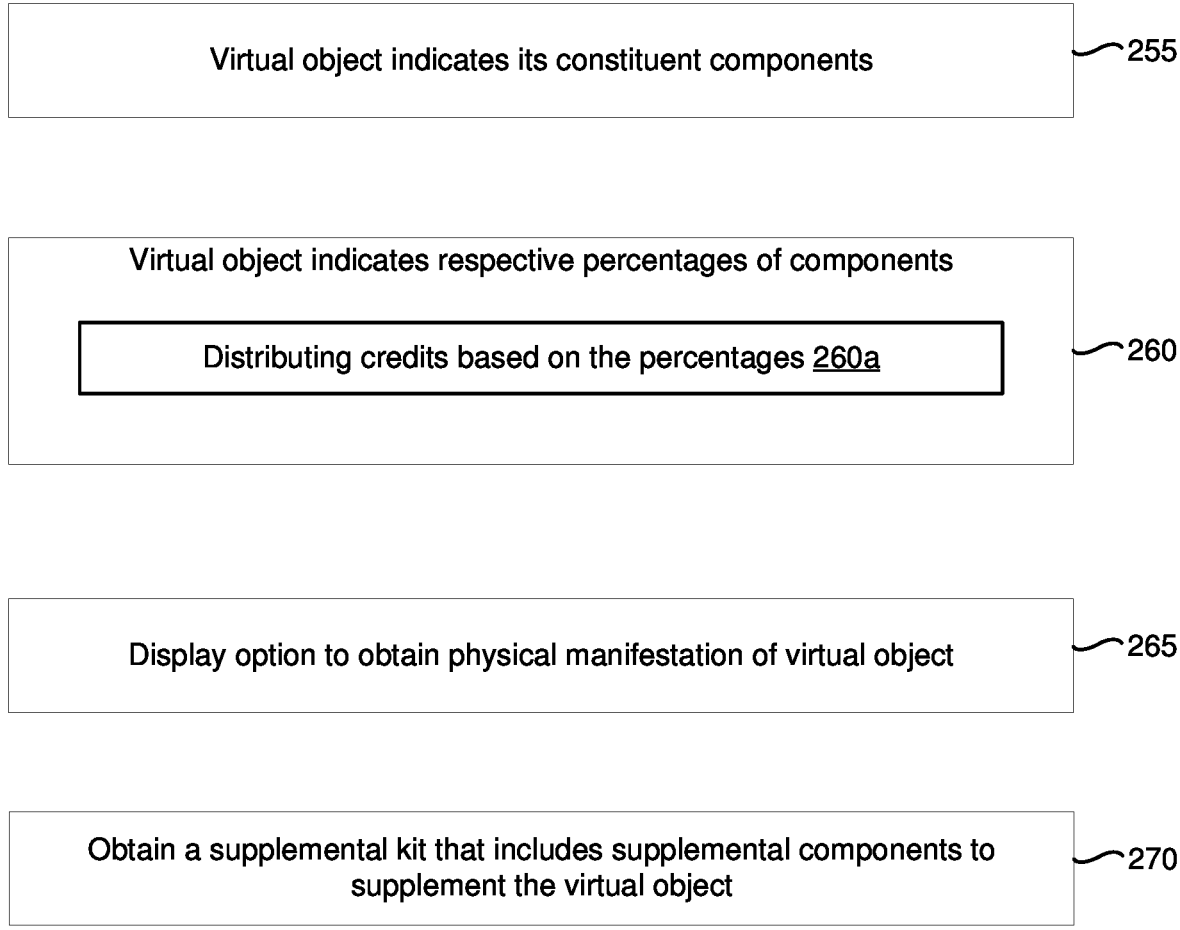

Referring to FIG. 2C, as represented by block 255, in some implementations, the virtual object indicates its constituent components. For example, in some implementations, the virtual object indicates the components that the virtual object is made of. For example, as illustrated in FIG. 1AL, the ant virtual object container 80 displays contribution information 870.

As represented by block 260, in some implementations, the virtual object indicates respective percentages of the components that the virtual object is made from. For example, as illustrated in FIG. 1AJ, the ant virtual object container 80 indicates the contribution percentages 872 for the components that the ant virtual object 70 is made from. As represented by block 260a, in some implementations, the method 200 includes distributing credits based on the contribution percentages. For example, as illustrated in FIG. 1AJ, the contribution credits 874 are distributed based on the contribution percentages 872. In some implementations, the method 200 includes distributing the credits to entities that created the respective components.

As represented by block 265, in some implementations, the method 200 includes displaying an option to obtain a physical manifestation of the virtual object. In some implementations, the method 200 includes allowing the user to 3D print the virtual object. For example, as illustrated in FIG. 1AK, the ant virtual object container 80 includes a 3D print affordance 85a. In some implementations, the method 200 includes allowing the user to purchase a physical model of the virtual object. For example, as illustrated in FIG. 1AK, the ant virtual object container 80 includes a buy affordance 85b to purchase a physical model of the ant virtual object 70.

As represented by block 270, in some implementations, the method 200 includes obtaining a virtual object supplemental kit (e.g., a supplemental kit) that includes supplemental components to supplement the virtual object. For example, as illustrated in FIG. 1AL, the virtual object supplemental kit 10a allows the user to supplement the ant virtual object 70 by applying a skin to the ant virtual object 70 and/or by accessorizing the ant virtual object 70.

Figure 3:
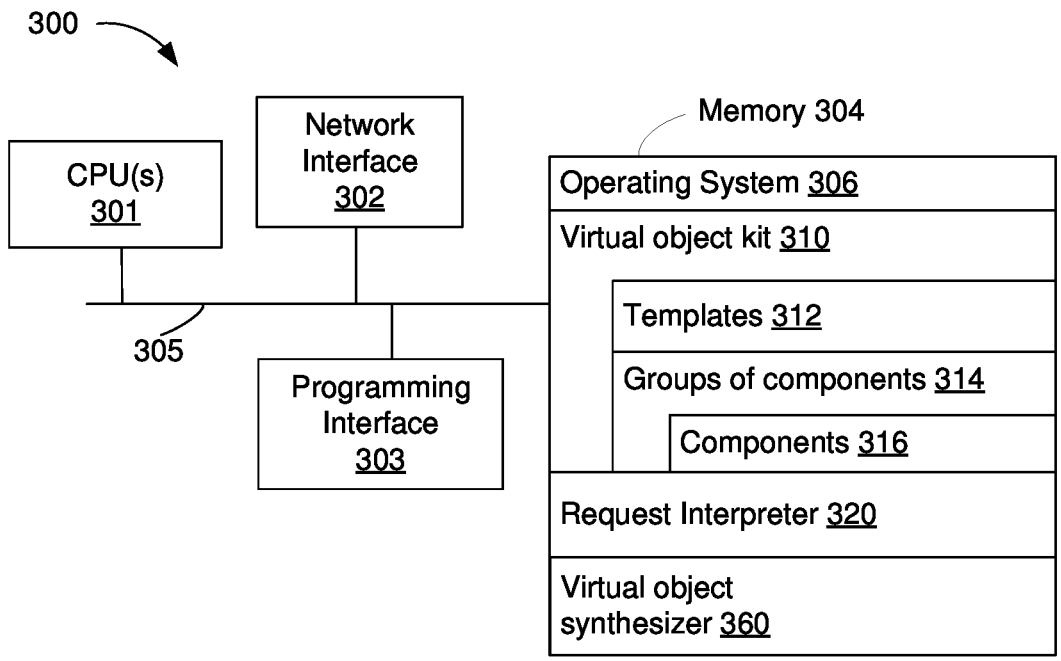
FIG. 3 is a block diagram of a server system that synthesizes a virtual object from a virtual object kit in accordance with some implementations.

FIG. 3 is a block diagram of a server system 300 enabled with one or more components of a device in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 300 includes one or more processing units (CPUs) 301, a network interface 302, a programming interface 303, a memory 304, and one or more communication buses 305 for interconnecting these and various other components.

In some implementations, the network interface 302 is provided to, among other uses, establish and maintain a metadata tunnel between a cloud hosted network management system and at least one private network including one or more compliant devices. In some implementations, the communication buses 305 include circuitry that interconnects and controls communications between system components. The memory 304 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 304 optionally includes one or more storage devices remotely located from the CPU(s) 301. The memory 304 comprises a non-transitory computer readable storage medium.

In some implementations, the memory 304 or the non-transitory computer readable storage medium of the memory 304 stores the following programs, modules and data structures, or a subset thereof including an optional operating system 306, a virtual object kit 310, a request interpreter 320, and a virtual object synthesizer 360.

In various implementations, the virtual object kit 310 is similar to the virtual object kit 10 shown in FIG. 1A. In some implementations, the virtual object kit 310 includes templates 312 (e.g., similar to the set of virtual object templates 20 shown in FIG. 1A). In some implementations, the virtual object kit 310 includes a plurality of groups of components 314 (e.g., similar to the plurality of groups of components 30 shown in FIG. 1A). In some implementations, each group of components 314 includes components 316 that correspond to a particular portion of a virtual object (e.g., one of the group of components 314 includes components that can be used as a head of a virtual object).

In various implementations, the request interpreter 320 interprets a request to synthesize a virtual object. For example, in some implementations, the request interpreter 320 obtains a user input selecting a template from the templates 312. In some implementations, the request interpreter 320 obtains another user input selecting particular components 316. In some implementations, the request interpreter 320 displays a prompt to complete selection of components (e.g., the request interpreter 320 displays the prompt 42 shown in FIG. 1V). In some implementations, the request interpreter 320 displays a prompt indicating that a selected component is incompatible with other previously selected components (e.g., the request interpreter 320 displays the prompt 44 shown in FIG. 1AB). In some implementations, the request interpreter 320 displays a prompt indicating that a selected component is compatible with other previously selected components (e.g., the requester interpreter 320 displays the prompt 46 shown in FIG. 1AD).

In various implementations, the virtual object synthesizer 360 synthesizes the virtual object based on the request. In some implementations, the virtual object synthesizer 360 synthesizes the virtual object using components from the virtual object kit that were identified in the request. In some implementations, the virtual object synthesizer 360 updates the virtual object kit to indicate the components that were used to synthesize the virtual object (e.g., the virtual object synthesizer 360 updates the soccer ball availability indicator 33b shown in FIG. 1 AG). In some implementations, the virtual object synthesizer 360 displays the virtual object in a virtual object container (e.g., the virtual object container 80 shown in FIG. 1K) thereby allowing the user to modify the virtual object, inspect the virtual object (e.g., by rotating the virtual object), instantiate the virtual object and/or share the virtual object.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including a display, a non-transitory memory and one or more processors coupled with the non-transitory memory:
    displaying, on the display, a user interface that includes a plurality of affordances;
    detecting a user input directed to at least one of the plurality of affordances, the user input corresponding to a request to synthesize a virtual object from a virtual object template that includes a plurality of groups of components, wherein the request indicates a selection of a subset of the plurality of groups of components;
    synthesizing the virtual object in accordance with the request, wherein a set of actions that the virtual object performs in an environment is a function of the subset of the plurality of groups of components that the virtual object includes; and
    displaying a preview of the virtual object on the display.

2. The method of claim 1, further comprising:
generating the set of actions for the virtual object based on the subset of the plurality of groups of components that the virtual object includes; and
displaying, on the display, the virtual object performing the set of actions in order to satisfy an objective of the virtual object.

3. The method of claim 1, further comprising:
obtaining a selection criterion that identifies a set of groups within the plurality of groups of components; and determining that the selection of components indicated in the request is incomplete in response to the selection of components missing a component from at least one of the set of groups identified by the selection criterion.

4. The method of claim 3, further comprising:
displaying, on the display, a prompt to complete the selection of components.

5. The method of claim 3, further comprising:
selecting default components for unselected groups of components in order to complete the selection of components.

6. The method of claim 3, wherein synthesizing the virtual object includes synthesizing an incomplete virtual object that is missing one or more components specified in the set of virtual object templates.

7. The method of claim 1, wherein at least one of the plurality of groups of components includes a combination of physical components, functional components and behavioral components.

8. The method of claim 1, wherein the plurality of groups of components includes components that are created by different entities.

9. The method of claim 1, wherein synthesizing the virtual object comprises:
determining whether the selected components are compatible with each other; and
in response to determining that at least one of the selected components is incompatible with at least another one of the selected components, displaying, on the display, a prompt to replace the at least one incompatible component of the selected components.

10. The method of claim 1, wherein synthesizing the virtual object comprises:
determining whether the selected components are compatible with each other; and
in response to determining that at least one of the selected components is incompatible with at least another one of the selected components, replacing the at least one incompatible component of the selected components with a default component.

11. The method of claim 1, wherein synthesizing the virtual object comprises:
determining whether the selected components are compatible with each other; and
in response to determining that at least one of the selected components is incompatible with at least another one of the selected components, synthesizing the virtual object without the at least one incompatible component of the selected components.

12. The method of claim 1, further comprising:
removing components that have been selected from the virtual object template.

13. The method of claim 1, further comprising:
displaying, on the display, a list of components that the virtual object is made from.

14. The method of claim 1, wherein the virtual object indicates respective percentages of components that were used to synthesize the virtual object.

15. The method of claim 14, further comprising:
distributing credits, based on the respective percentages, to entities that created the components that were used to synthesize the virtual object.

16. The method of claim 1, wherein each of the plurality of groups of components is associated with a particular portion of the virtual object.

17. A device comprising:
one or more processors;
a display;
a non-transitory memory; and
one or more programs stored in the non-transitory memory, which, when executed by the one or more processors, cause the device to:
display, on the display, a user interface that includes a plurality of affordances;
detect a user input directed to at least one of the plurality of affordances, the user input corresponding to a request to synthesize a virtual object from a virtual object template that includes a plurality of groups of components, wherein the request indicates a selection of a subset of the plurality of groups of components;
synthesize the virtual object in accordance with the request, wherein a set of actions that the virtual object performs in an environment is a function of the subset of the plurality of groups of components that the virtual object includes; and
display a preview of the virtual object on the display.

18. The device of claim 17, wherein the one or more programs further cause the device to:
generate the set of actions for the virtual object based on the subset of the plurality of groups of components that the virtual object includes; and
display, on the display, the virtual object performing the set of actions in order to satisfy an objective of the virtual object.

19. The device of claim 17, wherein the one or more programs further cause the device to:
obtain a selection criterion that identifies a set of groups within the plurality of groups of components; and
determine that the selection of components indicated in the request is incomplete in response to the selection of components missing a component from at least one of the set of groups identified by the selection criterion.

20. The device of claim 19, wherein the one or more programs further cause the device to:
display, on the display, a prompt to complete the selection of components.

21. A non-transitory memory storing one or more programs, which, when executed by one or more processors of a device, cause the device to:
display, on a display, a user interface that includes a plurality of affordances;
detect a user input directed to at least one of the plurality of affordances, the user input corresponding to a request to synthesize a virtual object from a virtual object template that includes a plurality of groups of components, wherein the request indicates a selection of a subset of the plurality of groups of components;
synthesize the virtual object in accordance with the request, wherein a set of actions that the virtual object performs in an environment is a function of the subset of the plurality of groups of components that the virtual object includes; and
display a preview of the virtual object on the display.

22. The non-transitory memory of claim 19, wherein the one or more programs further cause the device to:
generate the set of actions for the virtual object based on the subset of the plurality of groups of components that the virtual object includes; and
display, on the display, the virtual object performing the set of actions in order to satisfy an objective of the virtual object.

23. The non-transitory memory of claim 21, wherein the one or more programs further cause the device to:

obtain a selection criterion that identifies a set of groups within the plurality of groups of components; and determine that the selection of components indicated in the request is incomplete in response to the selection of components missing a component from at least one of the set of groups identified by the selection criterion.

24. The non-transitory memory of claim 23, wherein the one or more programs further cause the device to:

select default components for unselected groups of components in order to complete the selection of components.

\* \* \* \* \*